(12) United States Patent
Coulombe et al.

(10) Patent No.: US 6,404,439 B1
(45) Date of Patent: *Jun. 11, 2002

(54) SIMD CONTROL PARALLEL PROCESSOR WITH SIMPLIFIED CONFIGURATION

(75) Inventors: Jonathan Coulombe, Tokyo; Seiichiro Iwase, Kanagawa, both of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/034,856

(22) Filed: Mar. 4, 1998

(30) Foreign Application Priority Data

Mar. 11, 1997 (JP) .............................................. 9-056232

(51) Int. Cl.[7] .............................................. G06F 15/80
(52) U.S. Cl. ........................ 345/505; 345/502; 345/503; 345/506; 712/14; 712/20; 712/21; 712/22
(58) Field of Search .............................. 712/22, 21, 20, 712/14; 345/502, 505, 503, 506; 708/500, 521

(56) References Cited

U.S. PATENT DOCUMENTS

| | | | | |
|---|---|---|---|---|
| 5,046,023 A | * | 9/1991 | Katsura et al. | 345/434 |
| 5,479,272 A | * | 12/1995 | Saito | 358/518 |
| 5,581,773 A | * | 12/1996 | Glover | 712/14 |
| 5,594,679 A | * | 1/1997 | Iwata | 708/521 |
| 5,689,450 A | * | 11/1997 | Kurokawa et al. | 708/524 |
| 5,917,504 A | * | 6/1999 | Yutaka et al. | 345/509 |

* cited by examiner

Primary Examiner—Mark Zimmerman
Assistant Examiner—Kimbinh T. Nguyen
(74) Attorney, Agent, or Firm—Frommer Lawrence & Haug LLP; William S. Frommer; Glenn F. Savit

(57) ABSTRACT

According to the SIMD control parallel processing method for performing common operation in parallel in a plurality of elements, comprising first retaining means for retaining operation data specified by n-bit for each of said plurality of elements; second retaining means for previously retaining operated result with all possible combinations comprising said data according to a predetermined operation; and selecting means for selecting said operated data retained in said first retaining means from among said operated results retained by said second retaining means, from among retained data obtained through operation, data corresponding to that resultant from the operation is selected for each element, thereby enabling a configuration to be simplified, smaller and less costly.

26 Claims, 20 Drawing Sheets

SIMD CONTROL PARALLEL PROCESSOR WITH SIMPLIFIED CONFIGURATION

BACKGROUND OF THE INVENTION

1. Description of the Related Art

In recent years, image signal processing such as, digitizing demodulating image processing, compressing, and expanding the compressed image is disclosed for a satellite television modulation. As a processor programmably implementing this kind of processing, a processor having a single instruction stream/multiple data stream (SIMD) is well-known. The parallel processing method is disclosed in U.S Pat. No. 4,939,575, for example.

FIG. 18 shows a principle configuration of a related SIMD processor as described above. As shown in the figure, the processor includes data to be processed and a local storage 4 for storing the data resultant from the process. The local storage 4 stores a plurality of lines of pixel data to be processed. Data fetching unit (DFU) 5 receives a data item to be processed from among pixel data items retained in the local storage 4, and then retains the data item. Arithmetic and logical unit (ALU) 6 receives the pixel data being stored, performs predetermined operation for the data, and then supplies the data obtained by performing the operation to the local storage 4.

These local storage 4, DFU 5, and ALU 6 are divided into a plurality of processor elements 7-0 to 7-1079 in such a manner that a plurality of parallel operations can be simultaneously performed with each combination (with this example, 1,080 pieces) for each element. That is, the local storage 4, the DFU 5, and the ALU 6 are separated into local storage 4-0 to 4-1079, DFU 5-0 to DFU 5-1079, and ALU 6-0 to 6-1079 to constitute the local storage 4, DFU 5, and ALU 6. And, an operation is independently performed for each processor element. However, the operation performed by each processor element is common and its operation program to be run is directed to the ALU 6 via an instruction control bus 3 by the ALU SIMD controller 1. A program of the SIMD controller 1 is externally down-loaded.

FIG. 19 shows an example of configuration of the DFU 5-0 and ALU 6-0. Other DFUs 5-1 to 5-1079 and ALUs 7-1 to 7-1079, not shown, have the same configuration as the DFU 5-0 and ALU 6-0.

The DFU 5-0 receives 2-bit pixel data from the local storage 4-0 to cause them to be stored in a register 11 (register A) and a register 12 (register B), respectively. A register 13 (register C) was devised to retain carry-over data outputted by a full adder 22 (FA) included in the ALU 6-0.

Data retained in registers 11 to 13 of the DFU 5-0 is supplied to the full adder 22 of the ALU 6-0. The full adder 22 adds these three inputs and outputs a resultant sum and a carry-over to the selector 24. Among them, the carry-over is also supplied to the register 13 of the DFU 5-0.

The selector 24 selects either of two inputs transmitted from the full adder 22 to supply the input to a register 25 (a register W). The selection by the selector 7 is controlled by the SIMD controller 1 via an instruction control bus. The data retained in the register 25 is supplied to the local storage 4-0.

The full adder 22 adds the data retained in the registers 11 and 12 supplied from the local storage 4-0, and carry-over data generated in the previous calculation, outputting the added result data and carry-over data newly created to the selector 24. Additionally, the carry-over data is also supplied to the register 13 to be retained.

A SIMD controller 1 controls the selector 24 by way of an instruction control bus 3 to select, for example, a sum of the full adder 22 to retain the sum in a register 25. The operated result retained in the register 25 is supplied to the local storage 4-0.

The SIMD controller also controls the selector 24 so as to select the carry-over that the full adder 22 outputs and output it to a local storage 4-0 via register 25.

The operation described above is also performed in the other processors 7-1 to 7-1079 in a like manner.

FIG. 20 shows another principal configuration of a related SIMD control parallel processing method, the same symbols are assigned to portions corresponding to the same ones as in FIG. 21. In the configuration, the SIMD controller 1 controls the DFU 5 via the data control bus 2. And, DFU 5-0 and the ALU 6-0 are configured as shown in FIG. 21. The other DFU 5-1 to -1079, and ALU 6-0 to -1079, not shown, are configured identically to the DFU 5-0 and ALU 6-0, respectively.

The DFU 5-0 receives a 2-bit pixel data supplied from the local storage 4-0, and stores it in a register 11 (register A) and a register 12 (a register B), respectively. The selector 15 selects one data item among a predetermined value 1, data supplied to the register 11, and data retained in the register 14 to supply it to the register 14. It is directed by the SIMD controller 1 which input the selector 15 selects among these three inputs. A register 13 (register C) retains carry-over data outputted from the full adder (FA) included in ALU 6-0.

An AND circuit 20 of the ALU 6-0 performs logical al sum between data stored in the registers 11 and 14. An exclusive OR circuit 21 performs exclusive logical al OR between an output from the AND circuit 20, and data supplied by the SIMD controller 1 via the instruction control bus 3, and outputs the result obtained by the operation to a full adder 22. The full adder 22 is supplied data items each retained in the registers 12 and 13. The full adder 22 adds these three inputs, and outputs the sum and the carry-over resultant from the operation to a selector 24. Among them, the carry-over is supplied to the register 13 of the DFU 5-0.

The selector 23 selects either of the two data items supplied from the exclusive OR circuit 21 and the register 12 of the DFU 5-0 to output it to the selector 24.

The selector 24 selects either of the total three inputs of an input supplied from the selector 23 and two inputs from the full adder, and output it to a register 25 (register W). The selection of the selector 23 and the selector 24 are controlled by the SIMD controller via the instruction control bus. The data retained in the register 25 is supplied to the local storage 4-0.

For example, when the data stored in the local storage 4-0 is supplied to the ALU 6-0 as is, the SIMD controller 1 controls the selector 15 via the data control bus 2 so as to have a logical 1 stored therein to be selected to cause the register 14 to retain it. In addition, the selector 15 is caused to give a logical 0 to one input of the exclusive OR 21. As a result, a logical 1 retained in the register 14 is inputted to one side of the AND circuit 20, and thus data retained in the register 11 supplied by the local storage 4-0 passes the AND circuit 20 as it is and is inputted the full adder 22 via the exclusive OR circuit of the ALU 6-0. The full adder 22 adds data inputted from the exclusive OR circuit (data supplied from the register 11), data supplied from the local storage 4-0 and retained in the register 12, and carry-over data generated in the previous operation that is retained in the register 13, and output the result obtained by the addition and carry-over data newly generated to the selector 24. The carry-over is supplied to the register 13 also to be retained therein.

Additionally, the SIMD controller 1 controls the selector 24 via the instruction control bus 3 to cause the selector 24 to select, for example, a sum of the full adder 22 and then store it in the register 25. The result obtained by the operation that is stored in the register 25 is supplied to the local storage 4-0.

The SIMD controller 1 further can control the selector 24 to cause the selector 24 to select the carry-over outputted from the full adder 22 to output it to the local storage 4-0 via the register 25. Otherwise, the SIMD controller 1 enables the selector 23 to select either of two data items supplied by the exclusive OR circuit 21 or the register 12 and successively to select the data selected to supply it to the local storage 4-0 via register 25.

The SIMD controller 1, when it is desirous to reverse the logic of the data outputted from the AND circuit 20 and to supply it to the full adder 22, outputs a logical 1 to one input of the exclusive OR circuit 20. This causes the exclusive OR circuit 21 to output a logical 0 when a logical 1 is outputted from the AND circuit 20, and to output a logical 1 when a logical 0 is inputted from the AND circuit 20.

And, the SIMD controller 1, when it carries out a logical sum between newly inputted data and previous data, causes the selector 15 to re-select data retained in the register 14. This causes the register 11 to retain the next data, and thus current data and immediately previous data are inputted to the AND circuit 20 and performs its logical sum operation. The repetition of selecting the output of the register 14 by the selector 15 allows newly inputted data and past data to be logically operated.

The aforementioned operation is performed in the other processor elements 7-1 to -1079 in a like manner.

Japanese patent application number 07246627, 07290300, 08287173, and 08345359 disclose a similar image data processing system. Each of the above applications are owned by the assignee of the present invention and corresponding U.S. Applications are still pending.

SUMMARY OF THE INVENTION

As described above, in a conventional SIMD control processing method, each processor element 7-0 to 7-1079 is provided with an ALU (a full adder 22), respectively, thus making the configuration complicated. As a result, when this configuration is fabricated in an one-chip IC, an area occupied by the chip is not only enlarged, but also the IC is expensive. This was a remaining problem to be solved.

An embodiment according to the present invention will be described in detail hereinbelow.

The SIMD control parallel processing method described according to the first invention is characterized by including first retaining means (for example, a calculating unit 31 shown in FIG. 1) for retaining operated data specified by n-bit for each element, second retaining means (for example, an operation unit shown in FIG. 1) for previously retaining an operated result obtained by calculation performed in accordance with a predetermined equation, and selecting means for selecting the operated result corresponding to the one retained in the first retaining means for each element.

In the SIMD control parallel processing method according to the second invention, all previously calculated possible combinations of operated data specified by the n-bit data are previously retained. And, among operated result retained, a result corresponding to a calculated data is selected for each element.

Consequently, according to the SIMD control processing method and an operation method thereof according to the present invention, from among retained data obtained through operation, data corresponding to that resultant from the operation is selected for each element, thereby enabling a configuration to be simplified, smaller, and less costly.

DESCRIPTION OF THE PREFERRED EMBODIMENT

Figure 1:
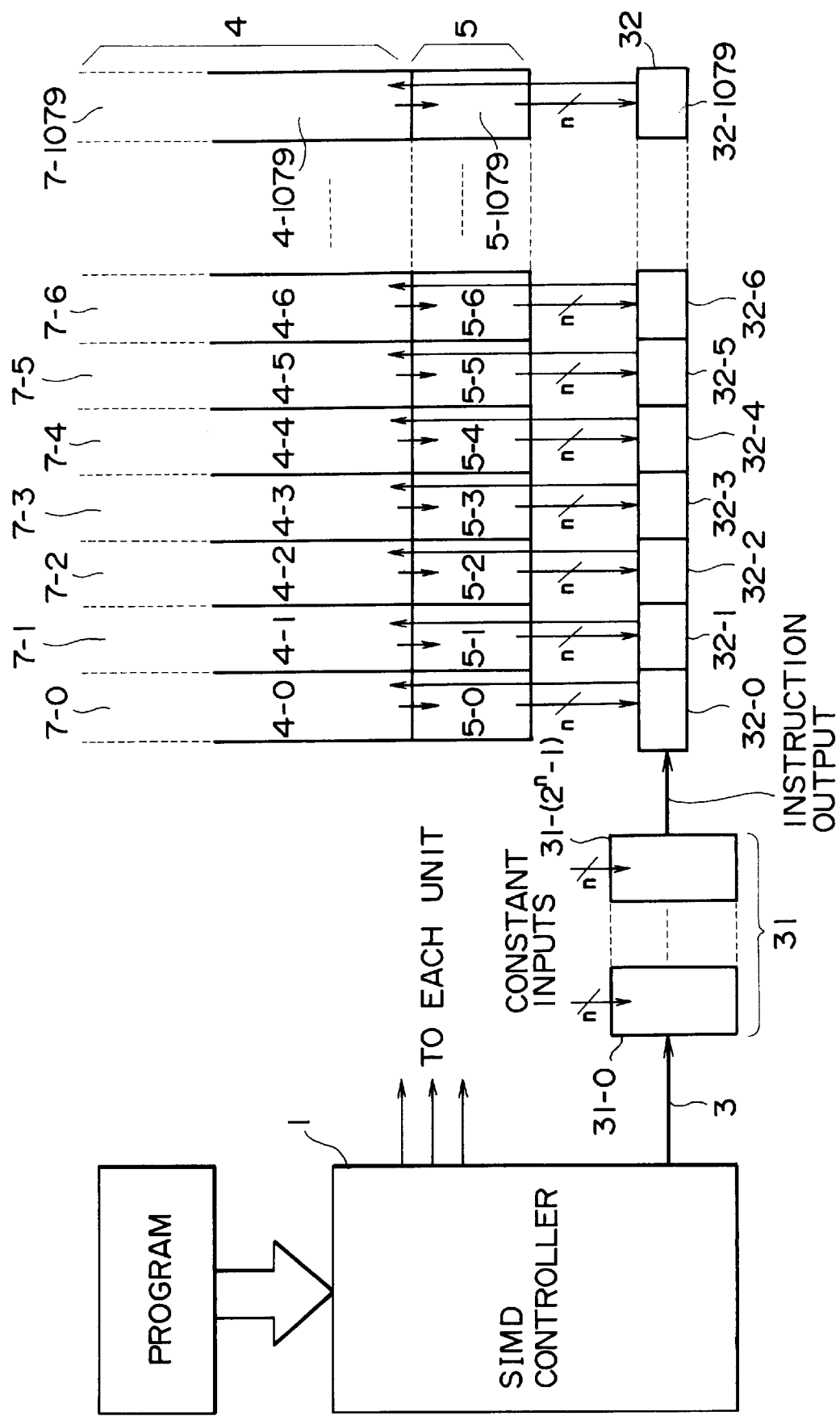
FIG. 1 is a block diagram showing a configuration of a SIMD control parallel processing method according to the present invention.
Figure 18:
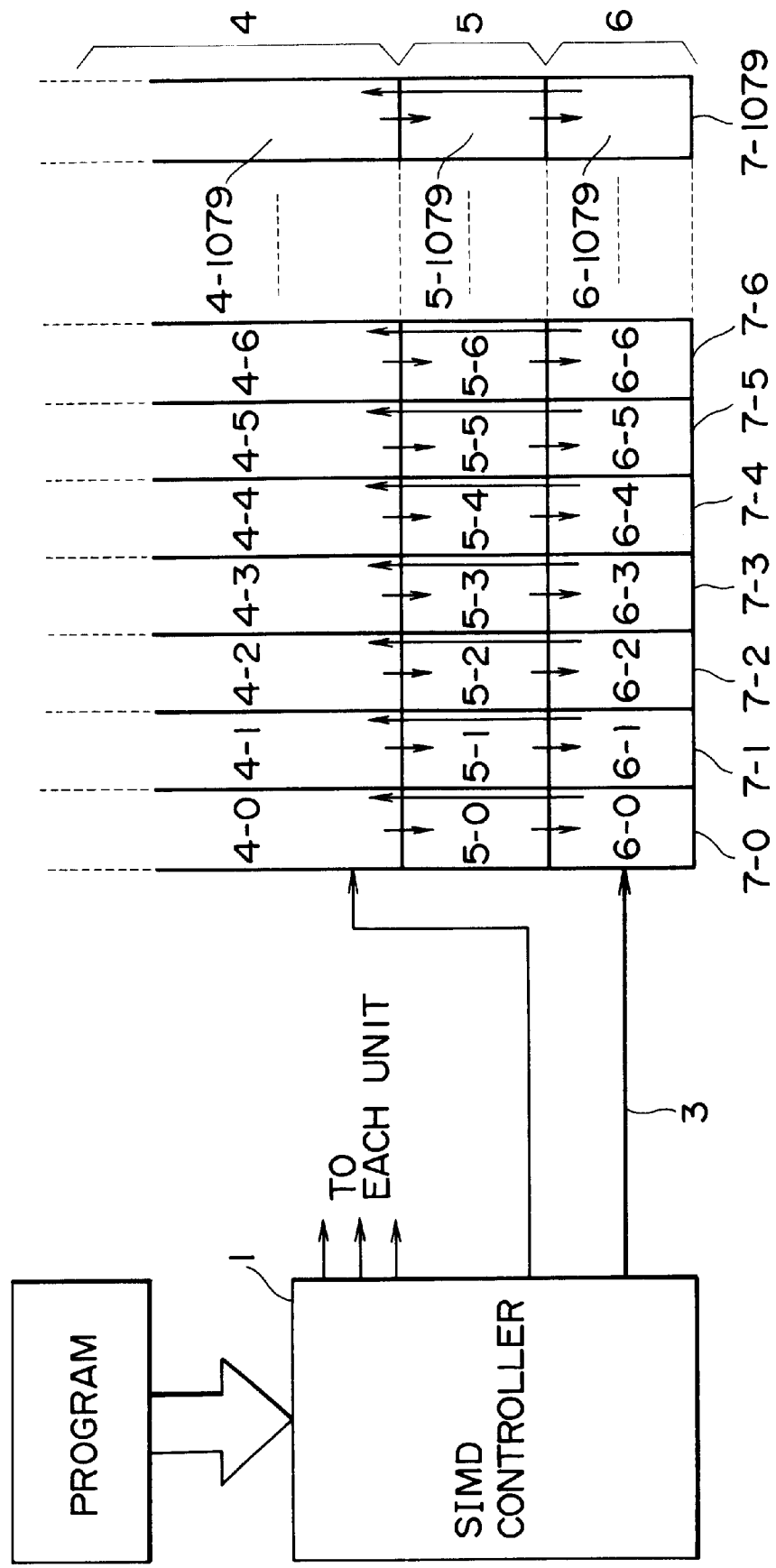
FIG. 18 is a block diagram showing a configuration of a related SIMD control parallel processing method.
Figure 19:
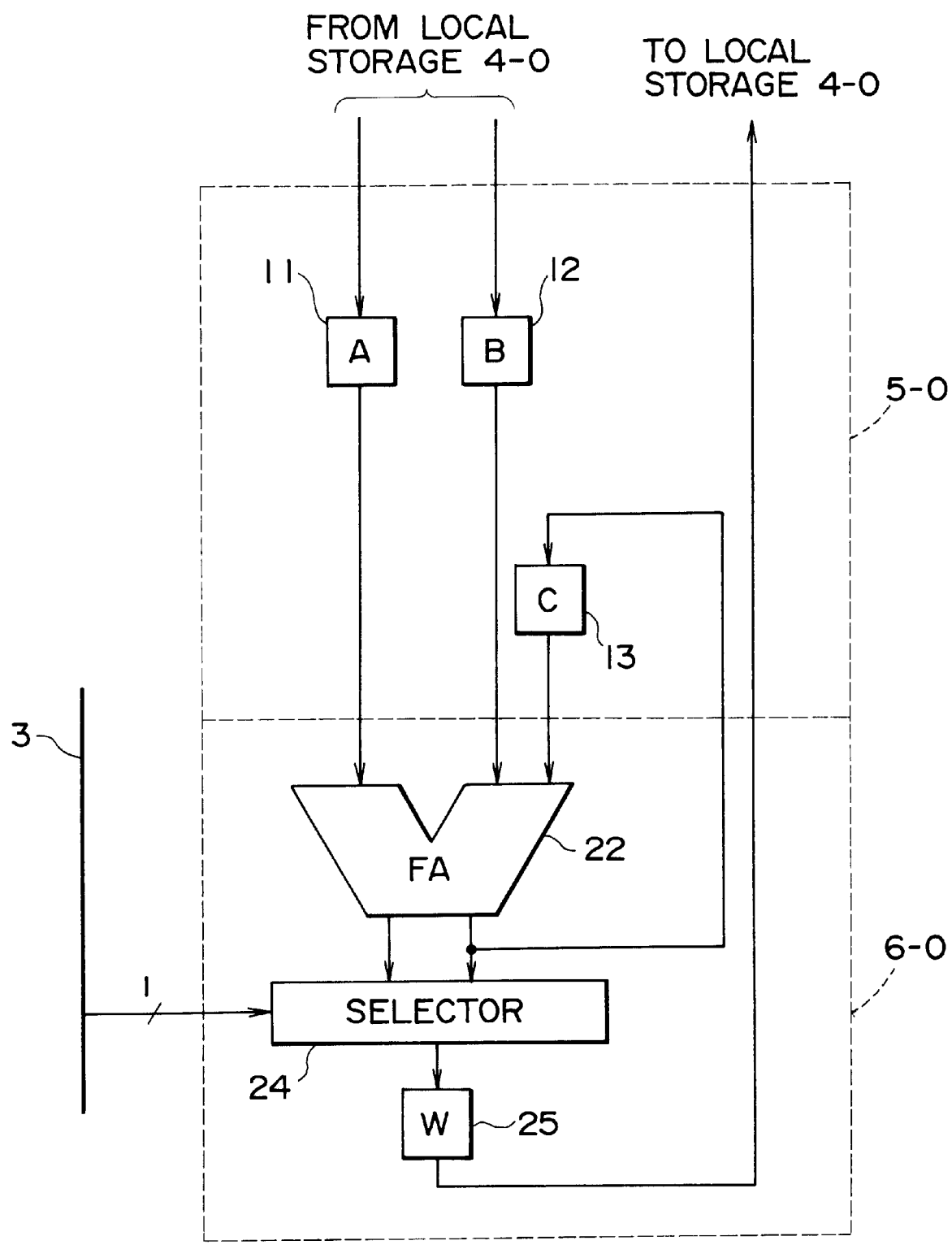
FIG. 19 is a block diagram showing each embodiment in a configuration of a DFU and an ALU shown in FIG. 18.
Figure 20:
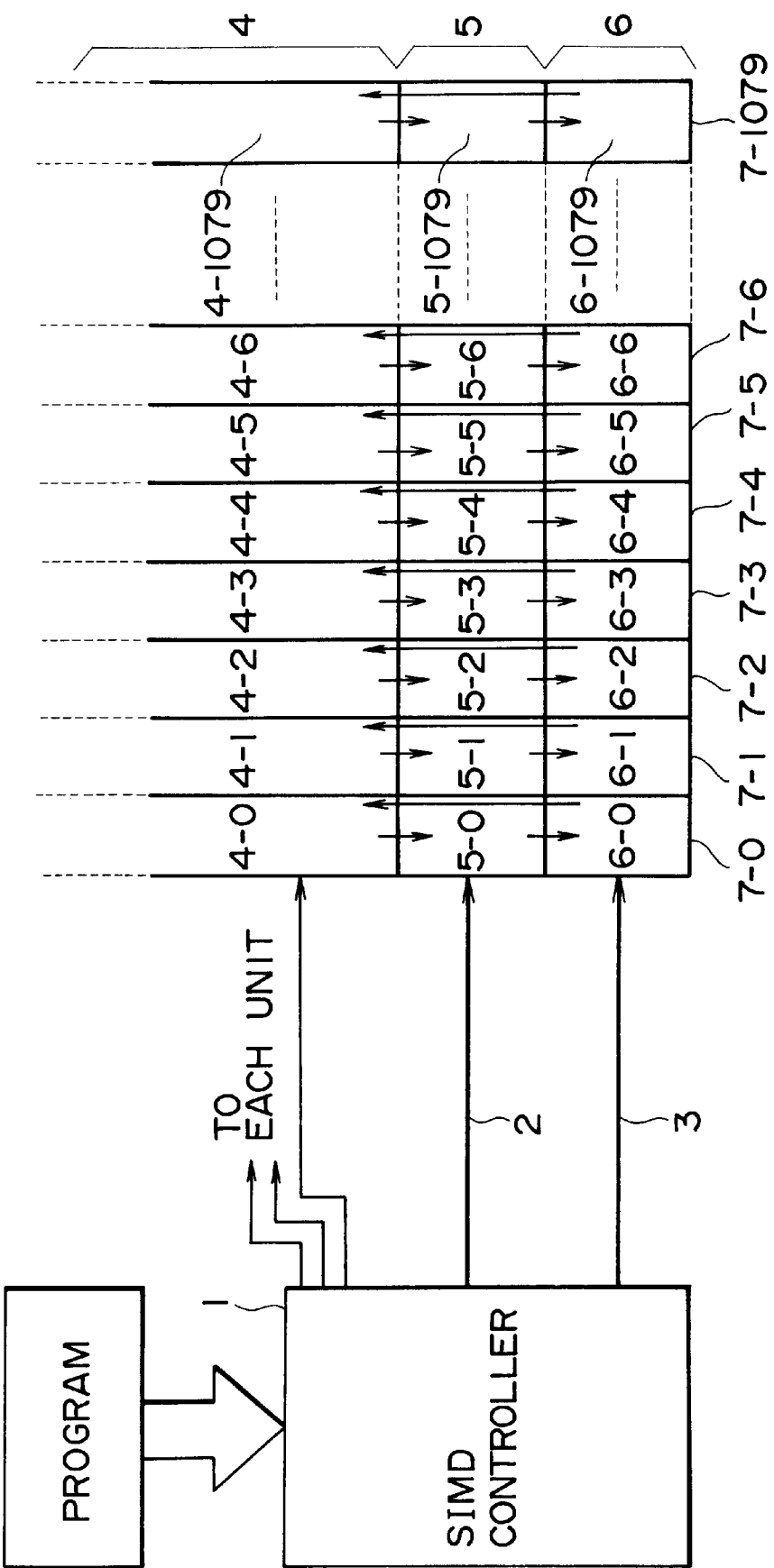
FIG. 20 shows another embodiment in a configuration of a SIMD control processing method.
Figure 21:
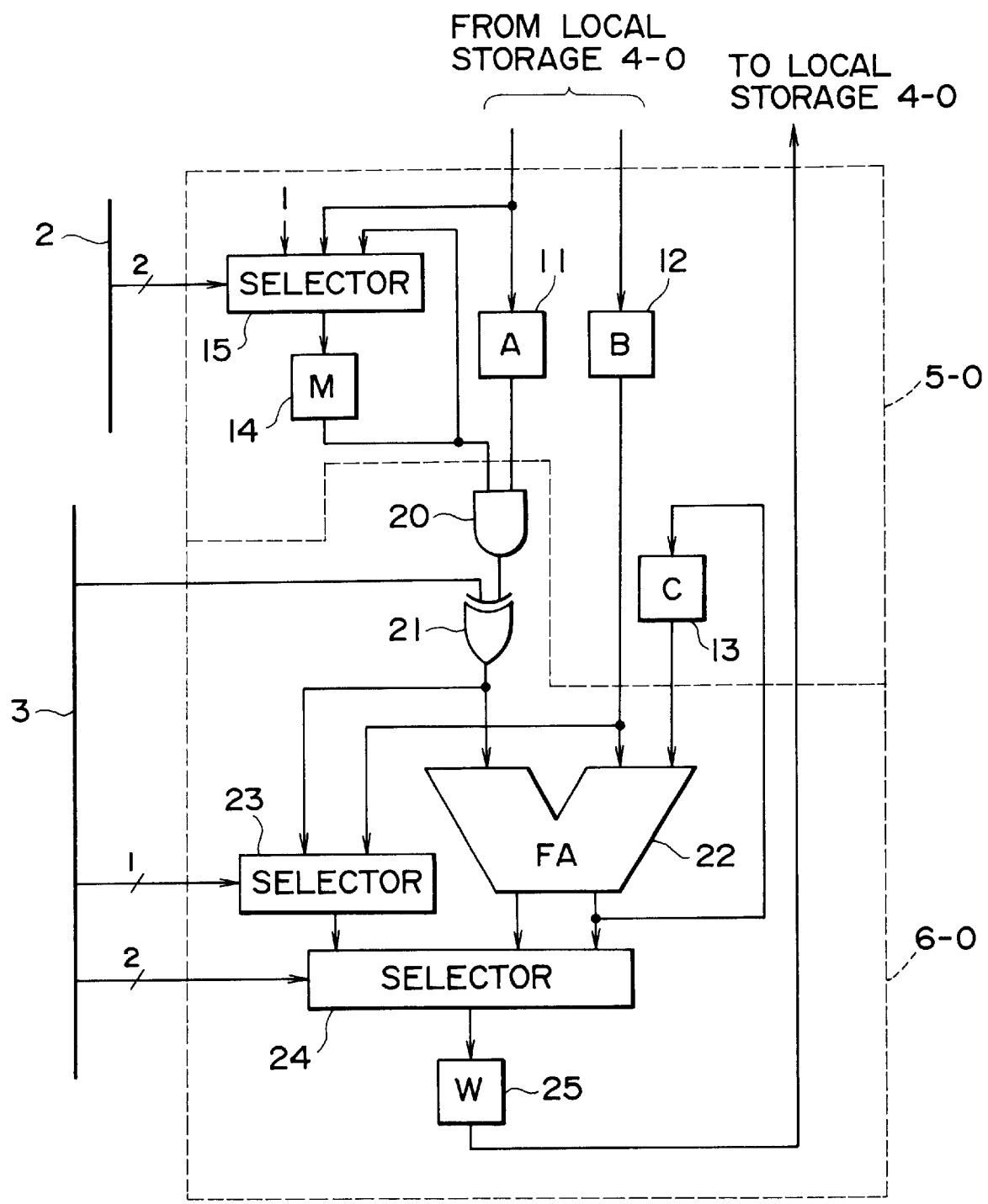
FIG. 21 is a block diagram showing each embodiment in a configuration of DFU and ALU shown in FIG. 20.

FIG. 1 is a block diagram showing a principal configuration in a SIMD control parallel processing method according to the present invention. In FIG. 18, the same symbols are assigned to those corresponding to the same portions in FIG. 1, thus resulting in omitting the descriptions thereof.

The ALU 6 in FIG. 18 is replaced with an operation unit 31 and a selecting unit 32.

When an n-bit operation is executed in each processor element 7-0 to 7-1079, the operation unit 31 is provided with the number of all combinations inevitably determined by the number of n-bit (normally $2^n$) of the operation units. Each predetermined n-bit data is respectively stored in $2^n$ pieces of the operating units 31-0 to 31-($2^n$–1), and the result obtained by the operation is outputted to the selecting unit 32. The selecting unit 32-0 to 32-1079 of each processor element 7-0 to 7-1079 selects a predetermined result and outputs it to a corresponding local storage 4-0 to 4-1079. The configuration is the same as in FIG. 18.

Figure 2:
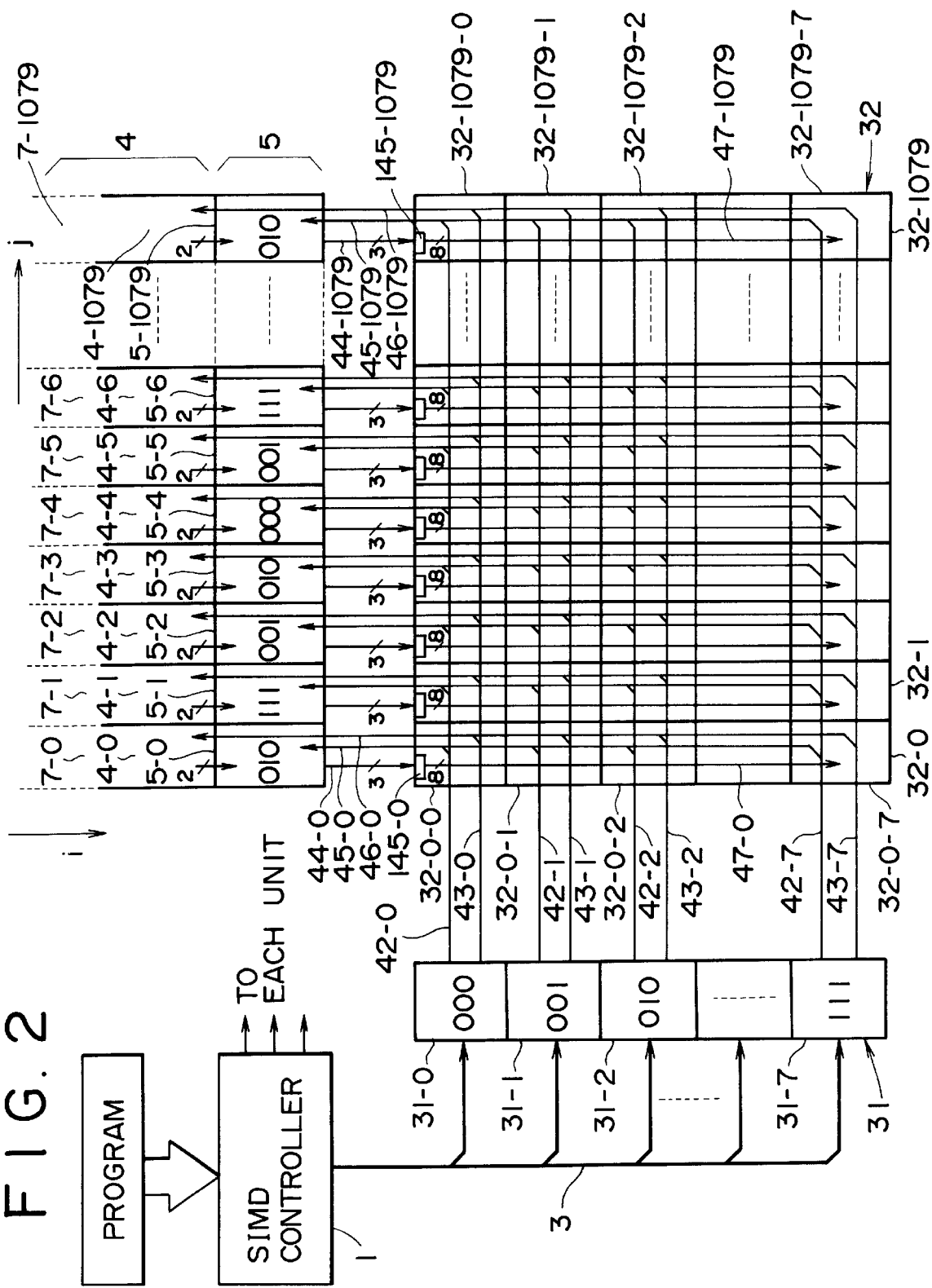
FIG. 2 is a block diagram showing an embodiment in a configuration of the SIMD control parallel processing method in which the number of input bits is 3.

FIG. 2 shows an embodiment of a configuration of a processor in which n is 3. That is, to the DFU 5-0 to 5-1079, 2-bit data is inputted to from the corresponding local storage 4-0 to 4-1079. Further, 2-bit data is inputted from the corresponding local storage 4-0 to 4-1079 and 1-bit of the carry-over from the immediately preceding operated result is added thereto. That is, total three bits of data is retained therein. The number of the combinations determined by three bits is eight, i.e., 000 to 111. Accordingly, one of the these combinations among eight combination of data is retained.

TABLE 1

| Input Z | Input Y | Input X | Output C | Output S |
|---------|---------|---------|----------|----------|
| 0 | 0 | 0 | 0 | 0 |
| 0 | 0 | 1 | 0 | 1 |
| 0 | 1 | 0 | 0 | 1 |
| 0 | 1 | 1 | 1 | 0 |
| 1 | 0 | 0 | 0 | 1 |
| 1 | 0 | 1 | 1 | 0 |
| 1 | 1 | 0 | 1 | 0 |
| 1 | 1 | 1 | 1 | 1 |

The resultant value from the addition of three 1-bit data is show in Table 1. That is, when three pieces of data (X, Y, Z) is 000, the result (0+0+0) of the calculation becomes 00. When the input is 010, the operated result becomes 10. On the other hand, when the input is 110, its operated result (1+1+0)becomes 10. And, when the input is 001, the operated result (0+1+1) becomes 10. And when the input is 111, the operated result (+1+1) becomes is 11, the operated result becomes 11. Accordingly, the full adder of the operating unit (for example, the full adder shown in FIG. 95-1) outputs LSB and C which represent a sum and a carry-over among 2-bit outputs, respectively.

In the figuration according to the present invention, operation unit 31-0 to 31-7 are provided as the operation unit 31-1 so as to perform operation when the input is 000 through 111 by each unit. Accordingly, the operation unit 31-0 outputs 00 (as the output C and the output S), and the operation units 31-1 and 31-2 output 10. Likewise, the operation unit 31-3 outputs 10, and an operation unit 31-4 outputs 01. Besides, the operation units 31-5 and 31-6 output 10, respectively. Finally, the operating unit 31-7 outputs 11.

The selection unit 32 is separated into 32-0 through 32-1079 corresponding to processor element 7-0 and 7-1079. For example, the selection unit 32-0 is further separated into a selection unit 32-0 through 32-7 as a selection unit for selecting any of the outputs from the selection units 32-0-0 through 32-0-7. Likewise, the inside of a selection unit in other selection units 32-1 through 32-1079 is separated into eight units.

And, selection units 32-0 through 32-1079 select data corresponding to 3-bit data retained in DFU 5-0 through -1079 from among each of the 2-bit outputs in the operation unit 31-0 through 31-7. And, from among selected results, the selection units out put a carry-over component (MSB) to the DFU 5-0 to -1079 and outputs the sum component (LSB) to a local storage 4-0 to 4-1079.

Like the selection unit, for example, each configuration of each processor element will more specifically be described hereinbelow, with reference to FIGS. 3 to 7. Basically, a numeral j corresponding to any processor element and a numeral i corresponding to any of eight operating units 31 are added to a numeral indicating a predetermined configuration (32), as represented as 32-j-i.

Figure 3:
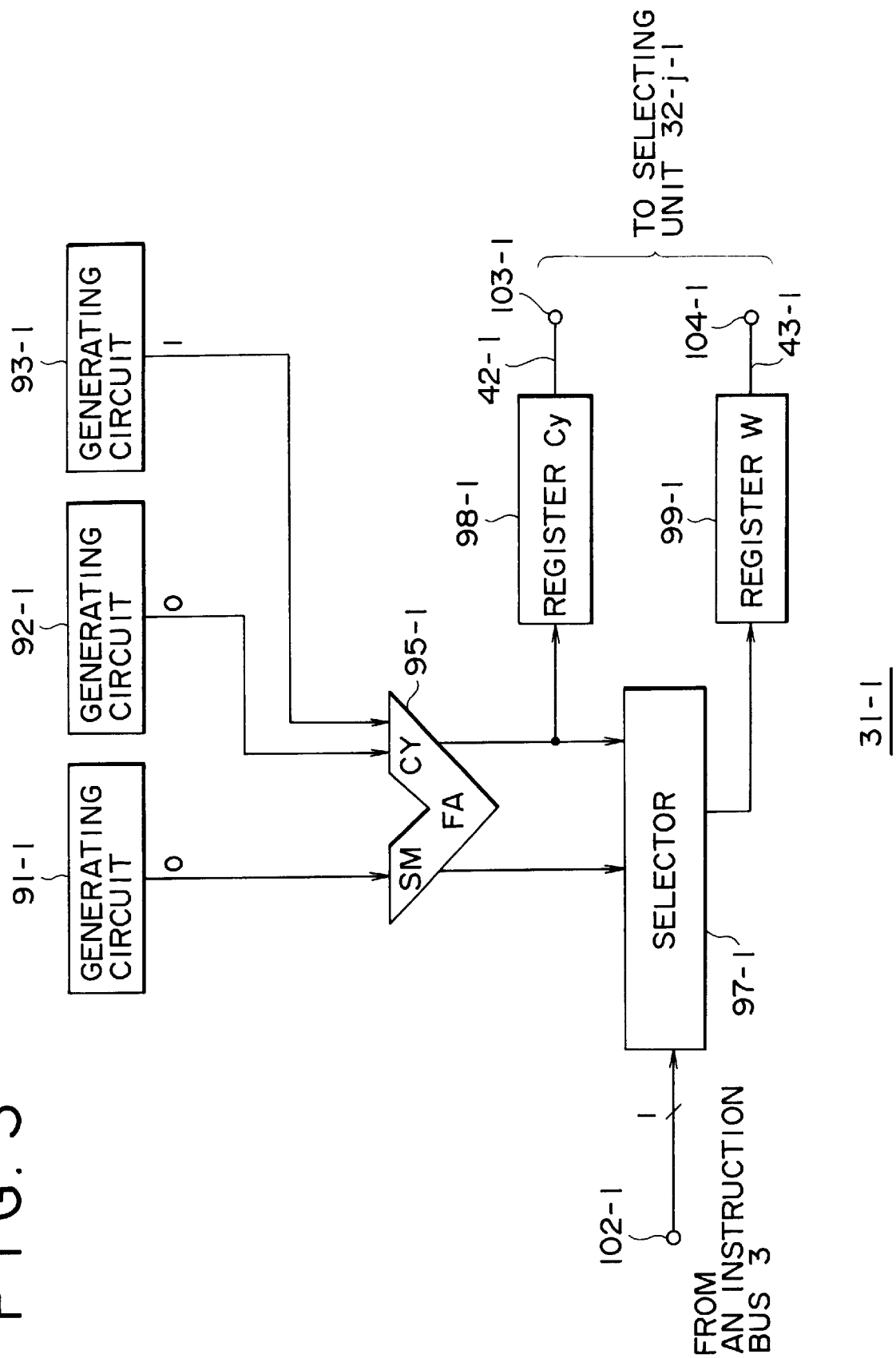
FIG. 3 is a block diagram showing an embodiment in a configuration of the arithmetic operation unit 31-1.

FIG. 3 shows an example of a configuration of the operation unit 31-1. Generation circuits 91-1 to 93-1 retain data of 0, 0, and 1, respectively. The generation circuits 91-1 to 91-3 can be configured by a circuit which can supply predetermined electric potentials each corresponding to 0 or 1, for example.

Since the operating unit 31-1 performs operation for data 001, the generation circuit 91-1 to 93-1 retains these data. Data 000 is retained, for example, in an operating unit 31-0, and data 010 is retained in an operating unit 31-2.

The outputs from the generating circuit 91-1 and 93-1 are directly inputted to a full adder 95-1 as is. The full adder 95-1 adds three input data items each comprising 1 bit and outputs a value resultant from the addition comprising two bits to the selector 97-1. Among the 2-bit output, carry-over on the MSB side is also supplied to a register 98-1 (a register Cy) to be retained. The data retained in the register 98-1 (the register Cy) is supplied to the selecting unit 32-j-i (j=1 to 1079) from a terminal 103-1 connected to line 42-1.

The selector 97-1 selects either of the two inputs in response to 1-bit control signal supplied by the terminal 102-1 from the SIMD controller via the instruction control bus 3 to output it the register 99-1 (register W). The data retained in the register 99-1 is supplied to the selecting unit 32-j-1 from the terminal 104-1 connected to the line 43-1.

Since basically an operation specified by three bits of 001 is performed in the operating unit 31-1, its output becomes 01 as shown in Table 1. In this case, the register 98-1 outputs 0 and the register 99-1 outputs 1.

Likewise, operating unit 31-0, 31-2, 31-3, . . . , 31-7 are also configured, but are not shown in the figures. The difference between them is data retained in each generating circuit 91-1 to 91-3.

Figure 4:
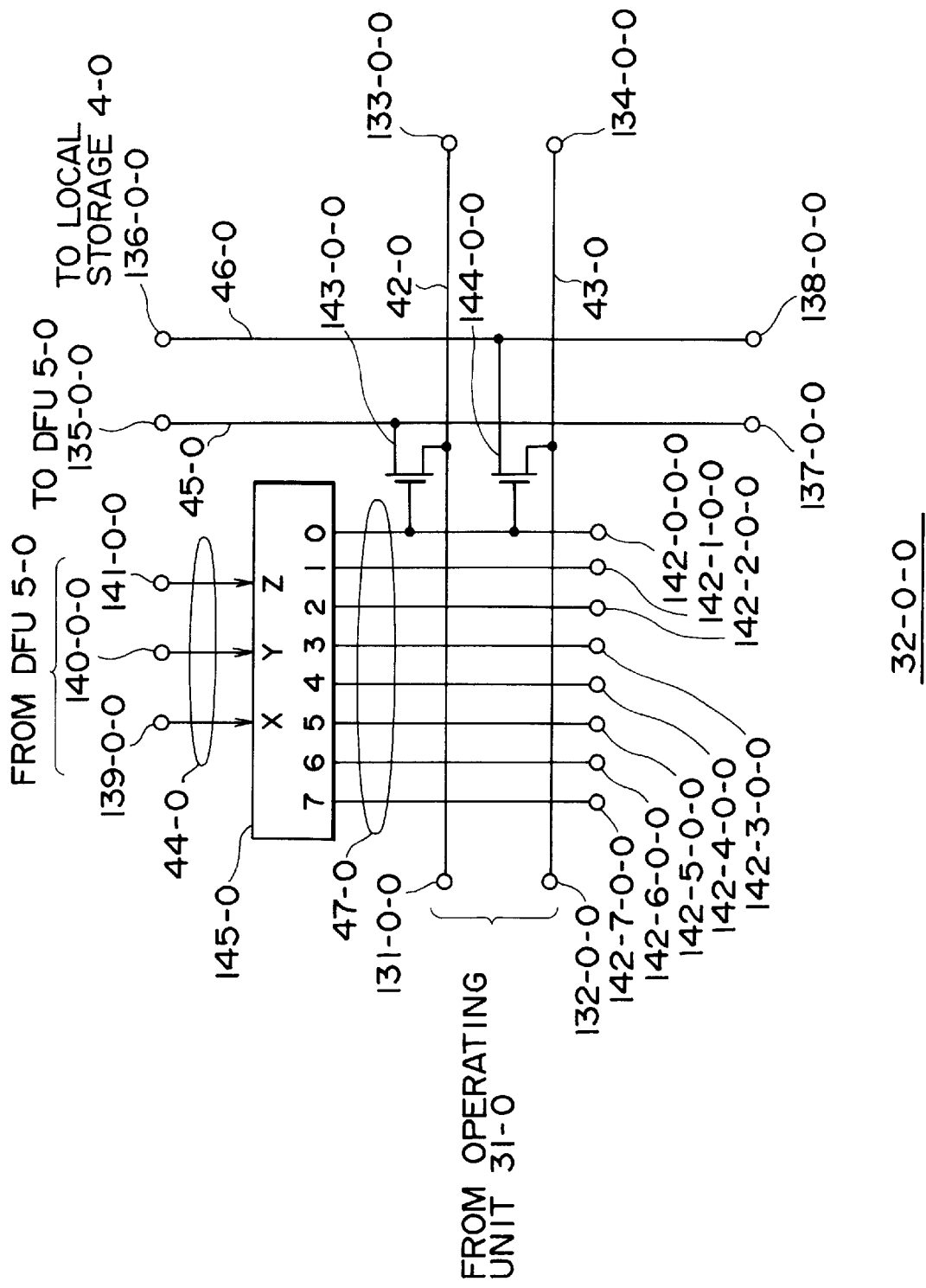
FIG. 4 is a block diagram showing an embodiment in a configuration of a selecting unit 32-0-0 shown in FIG. 2.

FIG. 4 illustrates a configuration of the selecting unit 32-0-0. Three-bit data is inputted from DFU 5-0 via a line 44-0 to a decoder 145-0. That is, data to be supplied via a line 44-0 from terminals 181-0, 182-0, and 183-0 shown in FIG. 6 to be described later is inputted to terminals 139-0-0, 140-0-0, and 141-0-0 as data X, Y, Z. The decoder 145-0 decodes the three-bit data (Z, Y, X) and outputs a logical 1 which is a selected signal from any one of the terminals. That is, when the input ZYX is 000, a logical 1 is outputted from the terminal numbered 0. That is, when the input ZYX is 000, a logical 1 is outputted from a terminal numbered 0, and when the input 001, a logical 1 is outputted from the terminal numbered 1. And when the input is 010, a logical 1 is outputted from the terminal numbered 2. In a like manner, when the input is 011 to 111, a logical 1 is outputted from terminals 3 to 7, respectively.

The selecting unit 32-0-0 operates when the operating units 31-1 selects carry-over data outputted via the line 42-0, and sum data outputted via line 43-0. That is, when the input is 000, the selecting unit 32-0-0 outputs selected data inputted via the lines 42-0 and 43-0 to then output it to the lines 45-0 and 46-0.

Provided with the selecting unit 32-0-0 are a transistor 143-0-0 whose input and output are connected to line 42-0 and 45-0, respectively and a transistor whose input and output are connected to a lines 43-0 and 46-0, respectively. With both of the transistors 143-0-0 and 144-0-0, each base is connected to the terminal 0 of the decoder 145-0. As a result, when a logical 1 is outputted from the terminal 0, transistors 143-0-0 and 144-0-0 are turned on, thereby each transmitting carry-over data outputted to the line 42-0 and sum data to the line 45-0 and line 46-0, respectively.

The terminal 135-0-0 of a line 45-0 is connected to a terminal 184-0 of the DFU 5-0 shown in FIG. 6 to be described hereinafter to supply carry-over data to a register 173-0. In addition, a terminal 136 of the line 46-0 is connected to a terminal 185-0 of the DFU 5-0 shown in FIG. 6 and transmitting sum data to a local storage 4-0 from the other terminal 179-0.

The other terminals 137-0-0 and 138-0-0 of the lines 45-0 and 46-0 are connected to terminals 135-0-0 and 136-0-0 (both terminals not shown) of the selecting unit 32-3-1 adjacently located downward. Additionally, the terminals 133-0-0 and 134-0-0 of the lines 42-0 and 43-0 are connected to the terminals 131-1-0 and 132-1-0 (both terminals not shown) of the selecting unit 32-1-0 adjacently located rightward.

Figure 5:
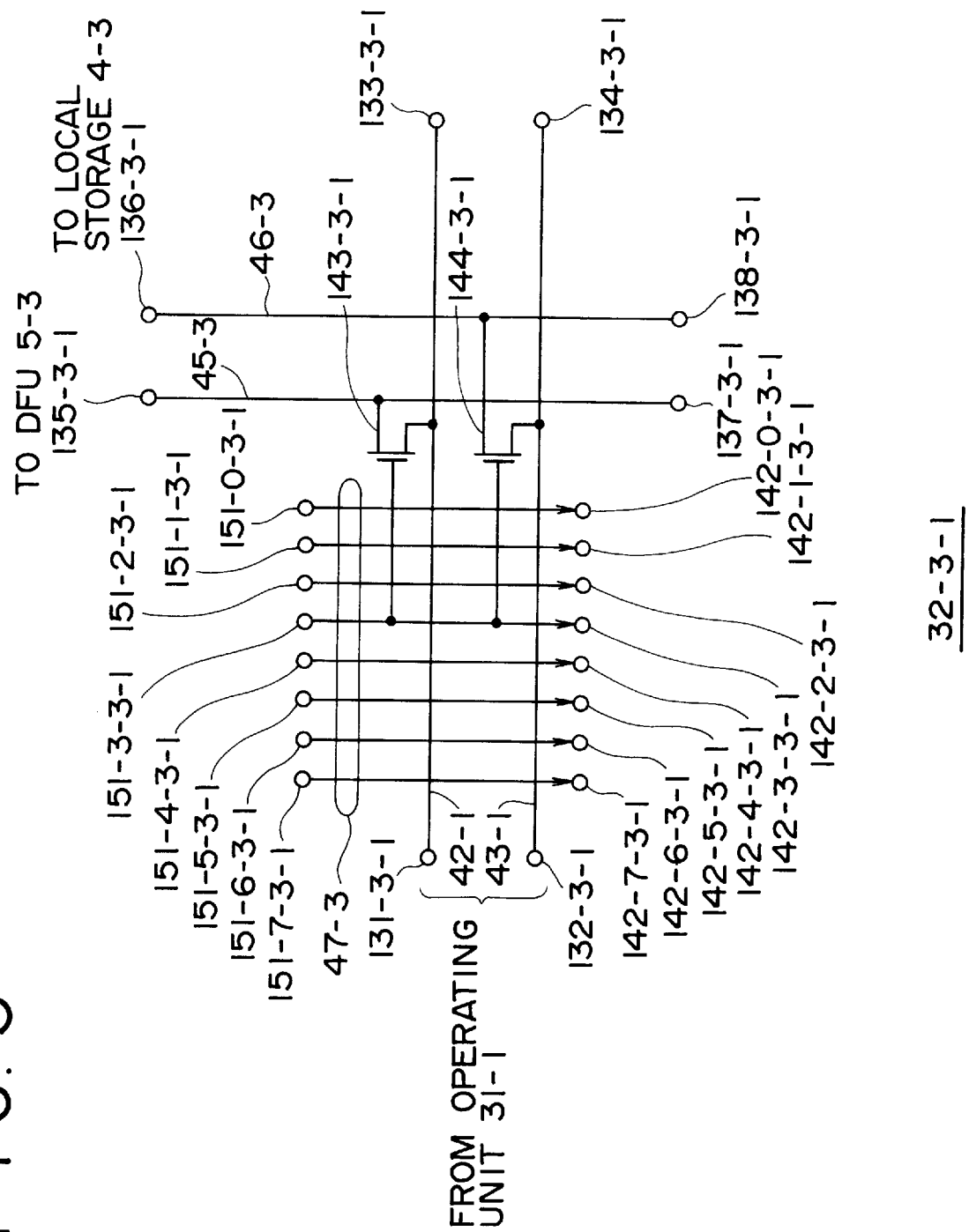
FIG. 5 is a block diagram showing an embodiment in a configuration of the selecting unit 32-3-1.

FIG. 5 shows a configuration of the selecting unit 32-3-1. The selecting unit 32-3-1 operates, when the operating unit 31-1 transmits carry-over data outputted from the line 42-1 by the operating unit 31-1 via the line 45-3 to the register 173-3 (not shown) of the DFU 5-3, and sum data outputted by the operation unit 31-1 via the line 43-1 to the local storage 4-3 via the line 46-3. In this selecting unit 32-3-1, each base of transistor 143-3-1 whose input and output are connected to line 42-1 and 46-3 and a transistor 144-3-1 whose input and output are connected to a line 43-1 and a line 46-3 is connected to terminal numbered 3 of a decoder 145-3 is arranged selecting unit 323-3-0 via the terminal 151-3-3-1.

As shown in FIG. 5, the selecting unit 32-3-1 is not provided with a decoder 145-3 corresponding to a decoder 145-0 shown in FIG. 4. The decoders 145-0 to -1079 are provided with each processor element 7-0 to -107 by one unit only. As shown in FIG. 2, they are provided with the leading selecting unit 32-0-0 to 7-1079 only (the highest one in FIG. 2). The outputs of the decoder 145-0 to -1079 is supplied to the other selecting unit (selecting units corresponding to operating units 31-1 to -7) via line 47-0 to 1079.

The other selecting units 32-j-i are configured identically to the cases shown in FIGS. 4 and 5.

Figure 6:
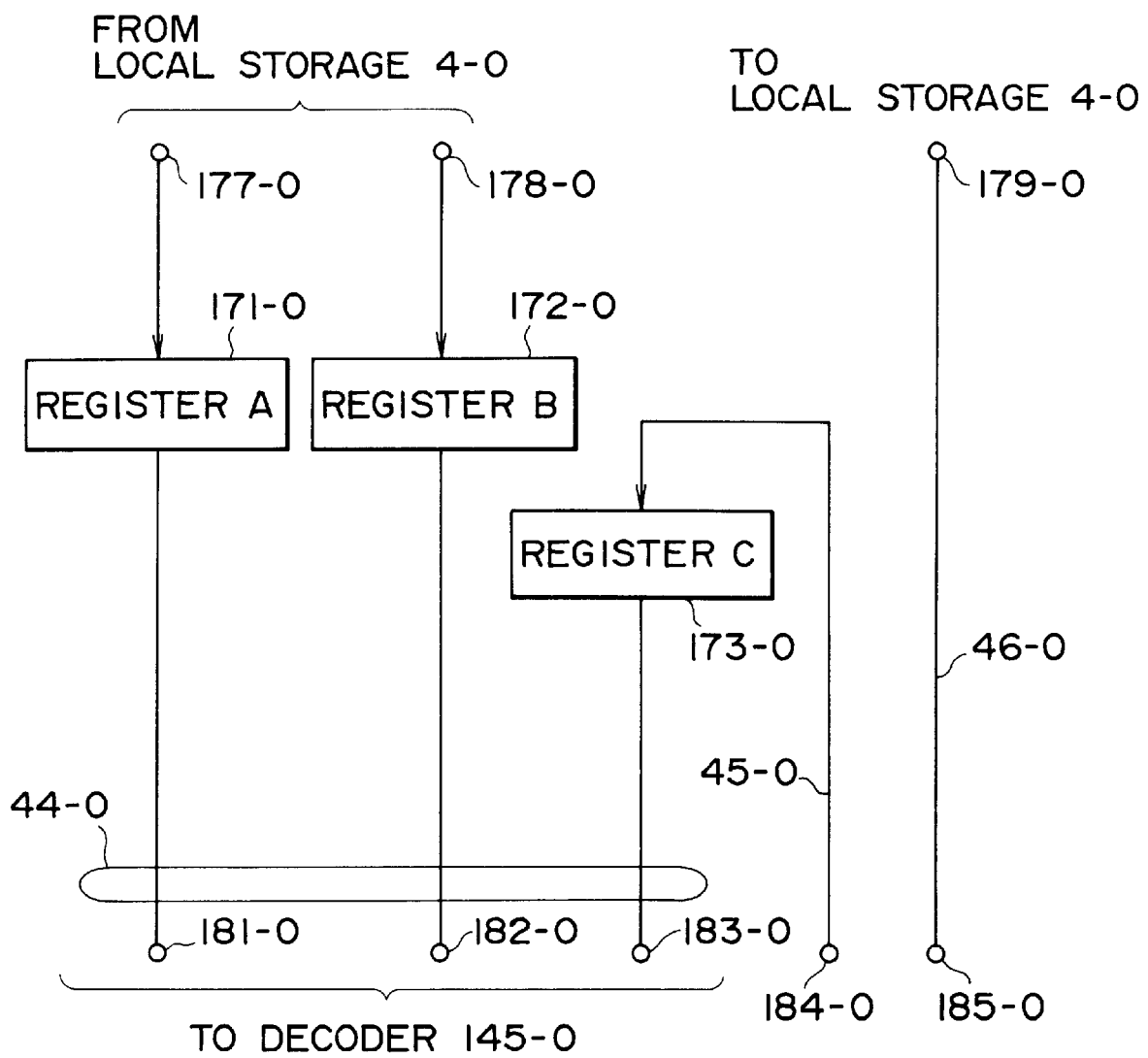
FIG. 6 is a block diagram showing an embodiment in a configuration of the DFU-5 shown in FIG. 2.

FIG. 6 shows an embodiment in a configuration of DFU 5-0. In this configuration, 2-bit data outputted from the local storage 4-0 is supplied to a register 171-0 (register A) and a register 172-0 (register B).

Data retained in registers 171-0 and 172-0 are outputted from terminals 181-0 and 182-0, respectively. Further, the register 173-0 (register C) retains data supplied from the terminal 184-0 via the line 45-0, and outputs the data retained from the terminal 183-0. As aforementioned, the terminals 181-0, 182-0, and 183-0 are connected to terminals 139-0-0, 140-0-0, and 141-0-0. As described above, 3-bit data outputted from the terminals 181-0, 182-0, and 183-0 via a line 44-0 is decoded by the decoder 145-0 and any of the terminals 0 to 7 of the terminal outputs a logical 1.

A terminal 185-0 shown in FIG. 6 is connected to a terminal 136-0-0 of the selecting unit 32-0-0 shown in FIG. 4, and sum data inputted from the other terminal 179-0 of the line 46-0 is transmitted to the local storage 4-0.

Figure 7:
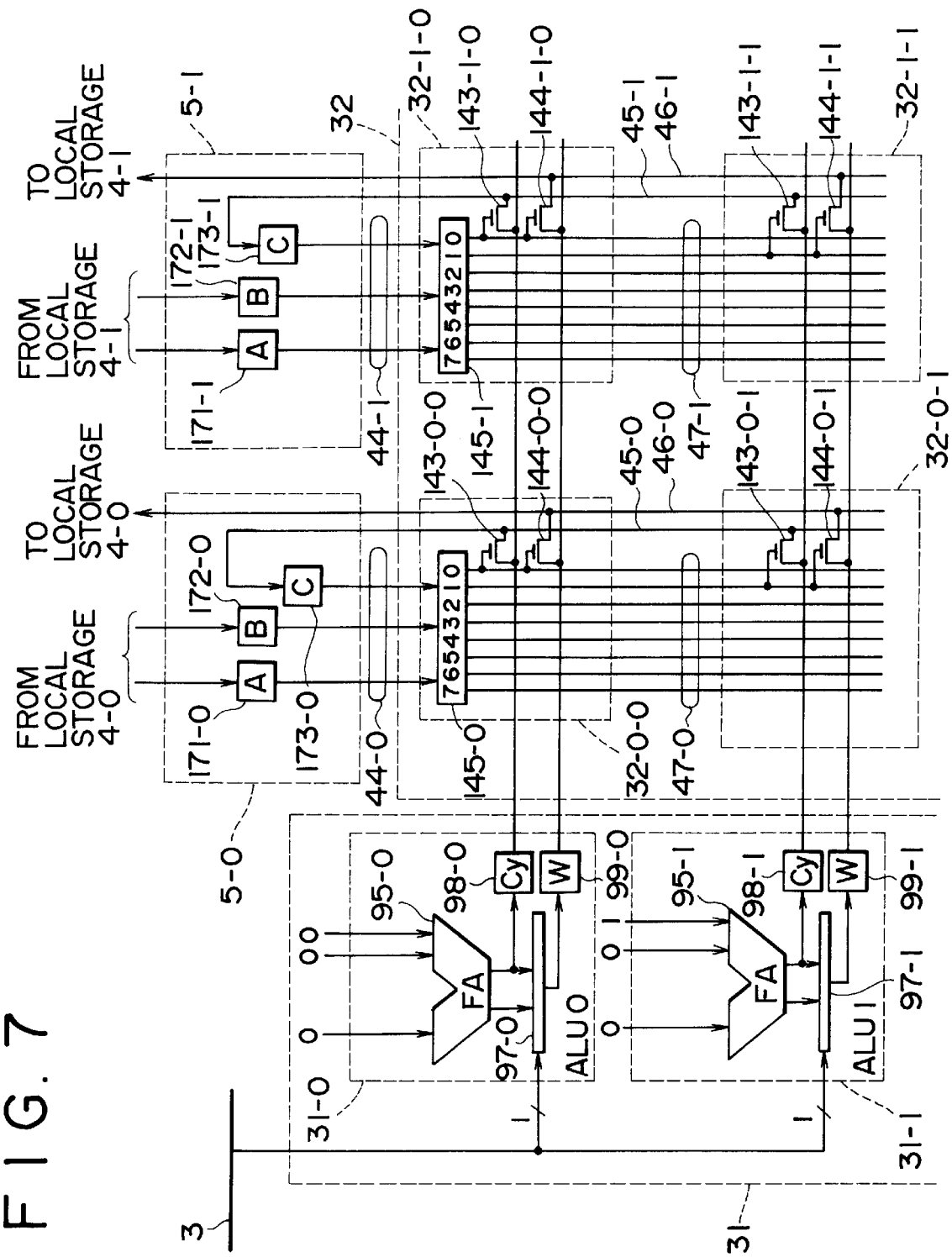
FIG. 7 is a block diagram showing a more specific embodiment in a connected state of the configuration shown in FIG. 2.

FIG. 7 shows a connection state of an operating unit 31, a selecting unit 32, and the DFU 5. In particular, FIG. 7 shows a connection state of the operating unit 31-0, and 31-1, a selecting unit 32-0-0, 32-1-0, 32-0-1, and 32-1-1, and the DFU 5-0, and DFU 5-1.

Next, its operation will be explained. Pixel data to be processed are assumed to be stored by a plurality of lines in a local storage 4. In the configuration embodiment shown in FIG. 2 the 0th to the 1079th pixel data on the horizontal scanning line are stored in the local storage 4-0 to 4-1079 of the processor element 7-0 to 7-1079. That is, for example, the zeroth pixel data among 5 horizontal scanning lines are retained, and the first pixel data among 5 horizontal scanning lines are retained, by local storage 4-0 and 4-1, respectively. Likewise, the same applies for the other local storage.

The SIMD controller 1 controls each DFU 5-0 to 5-1079 via a data control bus 2 to retain 2-bit data to be processed in respective registers 171-j and 172-j. At this time, carry-over data in the previous operation is retained in the register 173-j of the DFU 5-j. By so doing in the manner described above, for example as shown in FIG. 2, as for DFU 5-0 data 0, 1, 0 are retained in the register 171-0, to 171-3, respectively, and as for DFU 5-1, data 1, 1, 1, are retained in registers 171-1 to 171-3, and as for DFU 5-2, data 0, 0, 1 are retained in the registers 171-2 to 173-2. In the same fashion, as for DFU 5-3, DFU 5-5, DFU 5-6, and DFU 5-1079, data 0, 1, 0, data 0, 0, 0, and data 0, 1, 0 are assumed to be retained, respectively.

At this time, for example, in the processor element 7-0, 3 data ms 0, 1, 0 are added and the carry-over component among 2-bit data resultant from the addition is retained in the register 173-0 and the sum component is transmitted to the local storage to be stored. As aforementioned, when the operation data is 0, 1, 0, the operation is performed in the operating unit 31-2.

In other words, in the operating unit 31-2, data 0, 1, 0 are retained in generating circuits 91-2, 92-2, and 93-2, respectively. The full adder 95-2 adds data outputted by these generating circuit 91-2 to 93-2 and outputs the result obtained by the addition. This addition is represented as 0+1+0, and thus the added result becomes 01. Consequently, the full adder outputs a logical 0 as a carry-over to cause the register 98-2 to retain it. Besides, as a sum component, a logical 1 is outputted from the full adder 95-2 to be retained in a register 99-2 via a selector 97-2. Accordingly, data 0 corresponding to the carry-over has been outputted from the line 42-2, and data 1 corresponding to the sum component has been outputted via a line 42-2.

0, 1, 0 are inputted as data X, Y, Z from terminals 181-0 to 183-0 to the decoder 145-0 of the selecting unit 32-0-0. The input 010 equals 2 in decimal number, and therefore the decoder 145-0 outputs a logical 1 from the terminal numbered 2.

The selecting unit which includes transistor whose base is connected to terminal 2 is the selecting unit 32-0-2. Each transistor of the other selecting units 32-0-0, 32-0-1, 32-0-3 to 32-0-7 other than the selecting unit 32-0 is not connected to the terminal numbered 2. As a result, transistors 143-0-2 and 144-0-2 only of the selecting unit 32-0-2 are turned on, carry-over data only outputted onto the line 42-2 only is transmitted to line 45-0 via the transistor 143-0-2, and the sum data is transmitted from the line 43-2 to the line 46-0.

Data in the line 45-0 is transmitted to a register 173-0 of the DFU 5-0 to be retained therein. Data outputted onto the line 46-0 is transmitted to the local storage 4-0 to be retained.

On the other hand, the operation will be performed in the processor element as follows.

As shown in FIG. 2, 1, 1, 1 are retained in the registers 171-1 to 173-1 of the DFU 5-1. As a result, its decoder of the selecting unit 32-1-0, since 111 is inputted to its XYZ, outputs a logical 1 from the terminal 7. The selecting unit 32-1-7 only is provided with a transistor connected to the terminal numbered 7 of the decoder 145-7 among the selecting units 32-1-7 to 32-1-7. Accordingly, the transistors 143-1-7 and 144-1-7 of the selecting unit are turned on and the carry-over data 1 retained in the register 98-7 in the selecting unit 31-7 is transmitted to the line 45-1 from the line 42-7 via the transistor 143-1-7. In addition, the sum data 1 retained in the register 99-7 of the operating unit 31-7 is transmitted to the line 46-1 from the line 43-7 via the transistor 144-1-7.

Data transmitted to the line 45-1 is supplied to the register 173-1 of the DFU 5-1 to be retained therein. Additionally, data transmitted to the line 46-1 is further transmitted to the local storage 4-1.

Likewise, in the other processor elements, 7-2 to 7-1079, added results respectively retained in DFU 5-2 to DFU 5-1079 for which operation is performed by the operating unit 31 are selected by the selecting unit 32 to be transmitted to corresponding DFUs or local storage.

Since each processor element 7-0 to 7-1079 is SIMD-controlled and an operation process program runs in an interlocked cooperation with all together at once by 1-bit, when 1-bit data operation is completed for all pixels on a horizontal scanning line, bit data to be processed next is transmitted from the local storage 4 to the DFU 5. And, a process similar to that described above is performed. The present processor is a bit-processor and so performs process bit by bit.

As described above, within a horizontal scanning time interval, data transfer from a local storage 4 to the DFU 5, required operation processes, and transmission of an operation result to the DFU 5 and the local storage are controlled under a SIMD control program to be performed. This program is repeatedly run at a horizontal scanning time interval.

Incidentally, the following three operations are parallel-processed using the pipeline processing every one horizontal scanning time interval of image signal:

(1) externally inputting image data;
(2) transmitting data stored in the local storage 4 to DFU 5, selecting process (operation processing) of the transmitted data in the selecting unit 32, and transmission of operated results (selected results) to DFU 5 and local storage 4; and
(3) outputting image data as operated results.

Next, a more simplified configuration of the operating unit 31 will be explained. As described above, a fixed value is inputted to the operating unit 31. Thus, operated result by full adder becomes fixed values shown in Table 1. Accordingly, in operating units 31-0 to 31-i, a carry-over component and a sum component are given as fixed values.

For example, in the operating unit 31-0, as a carry-over component C and a sum component S, 00 are specified as their fixed inputs, respectively. Similarly, in the operating units 31-3, 31-4, and 31-5 and 31-6, 10, 01, and 11 are specified to be a fixed input value. The carry-over component among them is outputted from each operating unit as it is. And, a selector 97-0 to 97-7 are provided with each operating unit 31-0 to 31-7 to thereby select either of a carry-over component and a sum component in response to a control from an instruction control bus 3.

Figure 8:
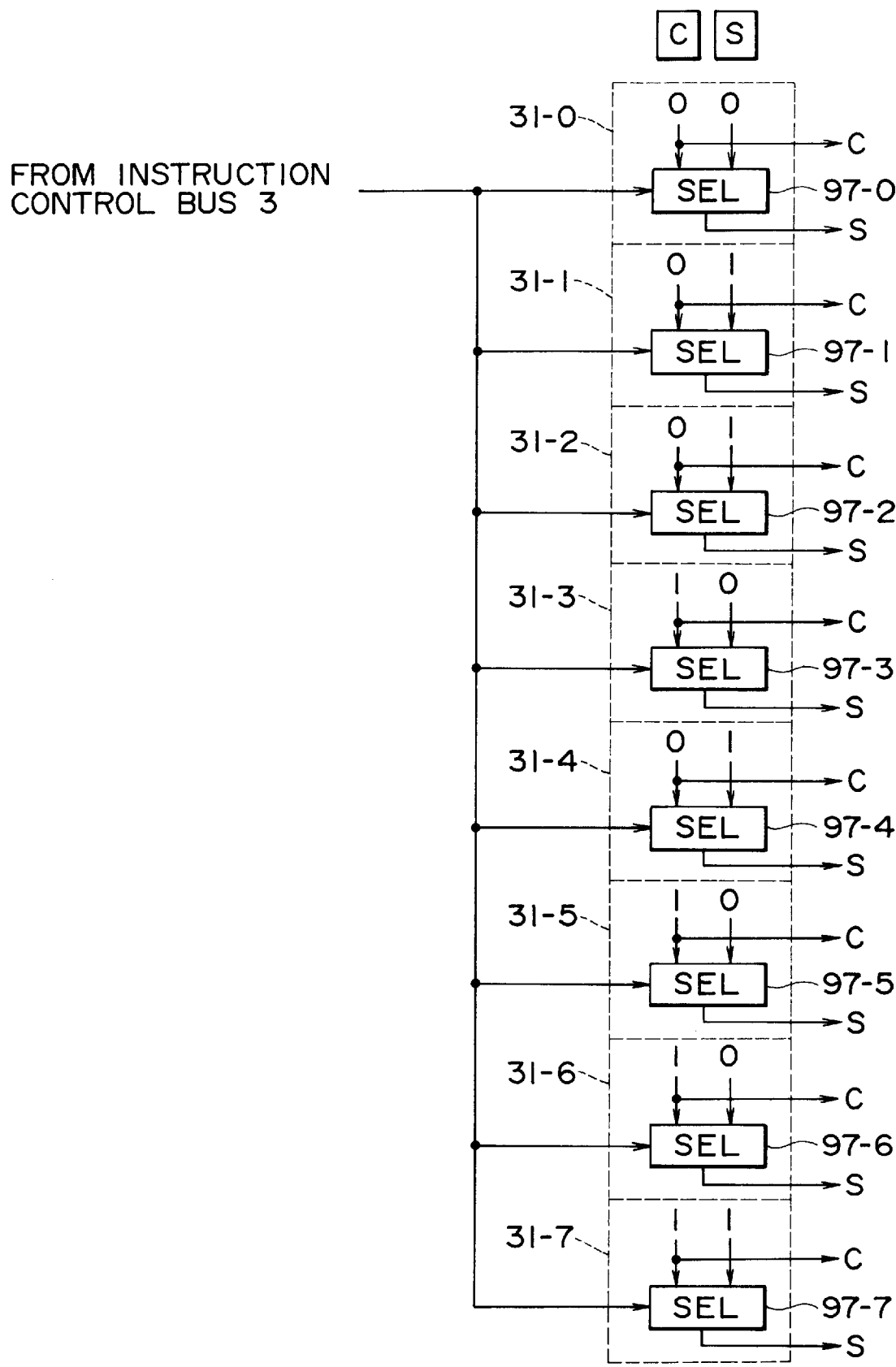
FIG. 8 is a block diagram showing another embodiment in a configuration of the operation unit 31.
Figure 9:
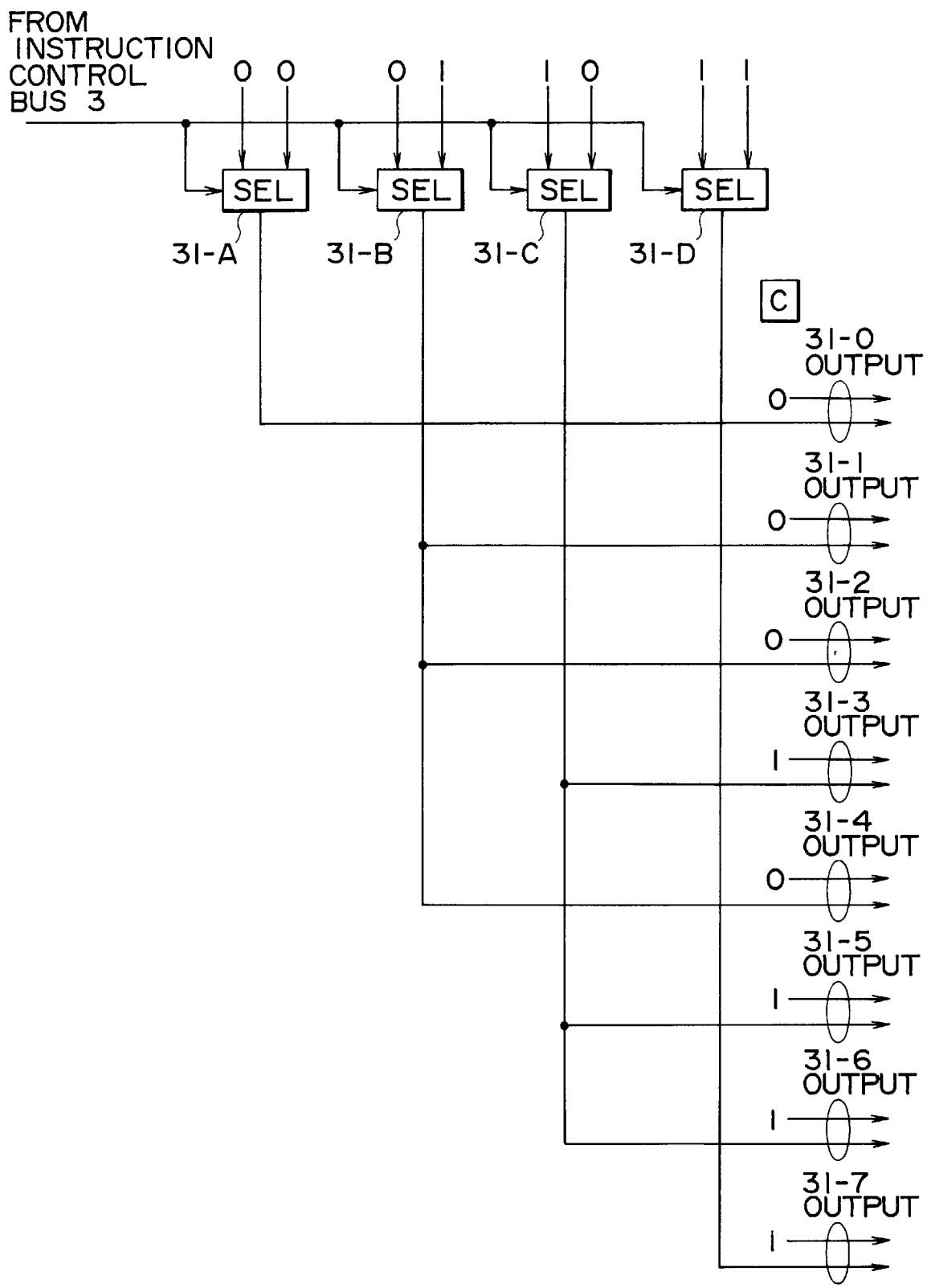
FIG. 9 is a block diagram of a more simplified configuration of the operation unit shown in FIG. 8.
Figure 10:
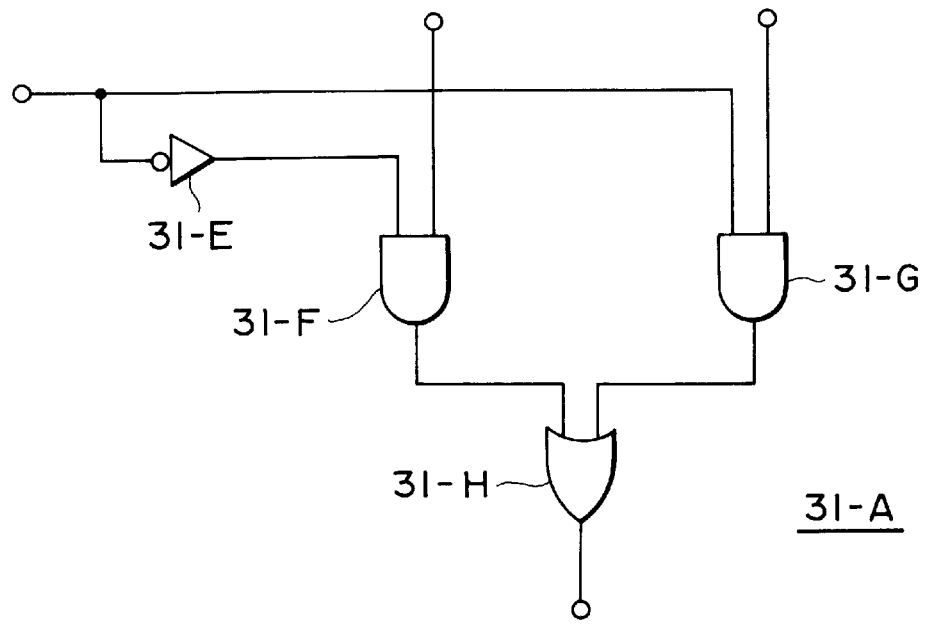
FIG. 10 is a block diagram of a configuration embodiment in the selector 31-A shown in FIG. 9.

The configuration shown in FIG. 8 can further be simplified as shown in FIG. 9. That is, data selected by the selector in the selectors 97-0 to 97-7 of each operating unit 31-0 to 31-7 is any of 00, 01, 10, and 11. Thus, in the configuration shown in FIG. 9, selectors each corresponding to the data are exclusively provided as selectors 31-A to 31-D. The output from the selector 31-A is supplied to the operating unit 31-0, and the output of selector 31-B is supplied to the operating units 31-1, 31-2, and 31-4. And further, the output from the selector 31-C is supplied to the operating units 31-1, 31-5, and 31-6, and the output of the selector 31-D is supplied to the operating unit 31-7. In each operating unit, a sum component supplied from selectors 31-A to 31-D is outputted as is, and as the carry-over component, a given fixed value is outputted.

The selectors 31-A to 31-D shown in FIG. 9 can be configured by two AND circuits 31-F and 31-G, one inverter 31-E, and one OR circuit 31-H. For example, when a logical 1 is inputted to one input of the AND circuit 31-G as a control signal from the instruction control bus 3, the input of the control signal of the AND circuit 31-F is inverted by the inverter circuit 31-E and thus a logical 0 is outputted from the inverter 31-E. Accordingly, in this case, the output of the AND circuit 31-G is outputted from the OR circuit 31-H. On the other hand, when a control signal is set to a logical 0, inversely, the output of the AND circuit 31-F is outputted from the OR circuit 31-H.

Figure 11:
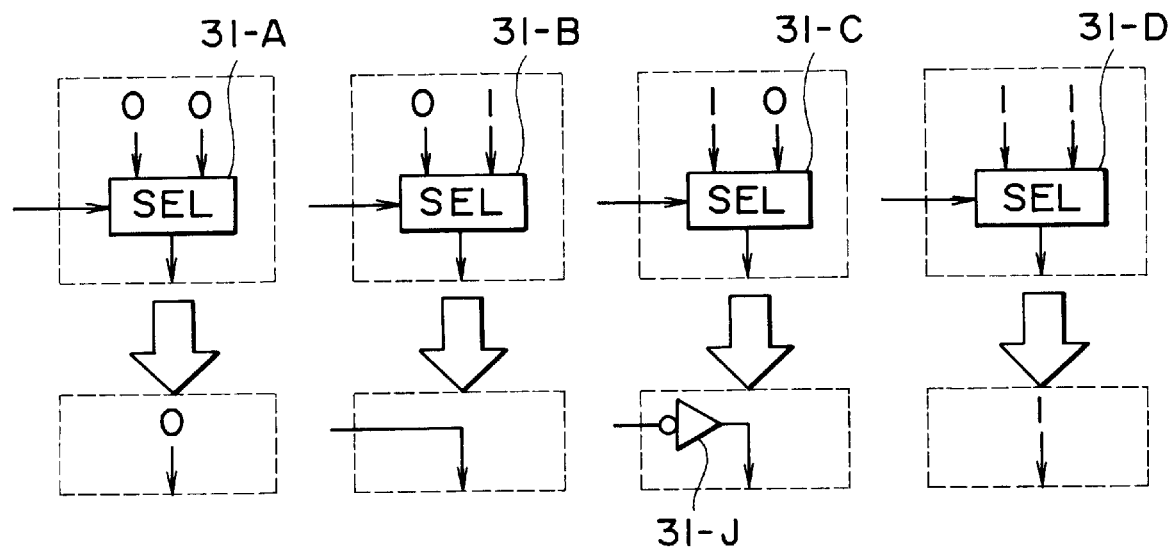
FIG. 11 is a block diagram showing a more simplified embodiment in a configuration of selectors 31-A through 31-D.

Hence, selectors 31-A to 31-D shown in FIG. 9 can be configured as shown in FIG. 11. With the selector 31-A, both two inputs are zero, and thus the output from the selector 31-A is always 0, thereby enabling selector 31-A to be omitted and the fixed value 0 to be outputted.

The selector 31B outputs a logical 1 when a control signal for the selector is a logical 1, while outputs a logical 0 when a control signal for the selector is a logical 0, thus resulting in allowing a control signal to be issued as it is.

The selector 31C outputs a logical 0 when the control signal is a logical 1, while outputs a logical 1, when the control signal is a logical 0, thus resulting in allowing a control signal to be inverted by the inverter and then issued as it is.

In addition, with the selector 31-D, both of the inputs are a logical -al 1, and therefore the output will always be a logical 1. Consequently, a fixed value 1 is configured to always have to be outputted.

Figure 12:
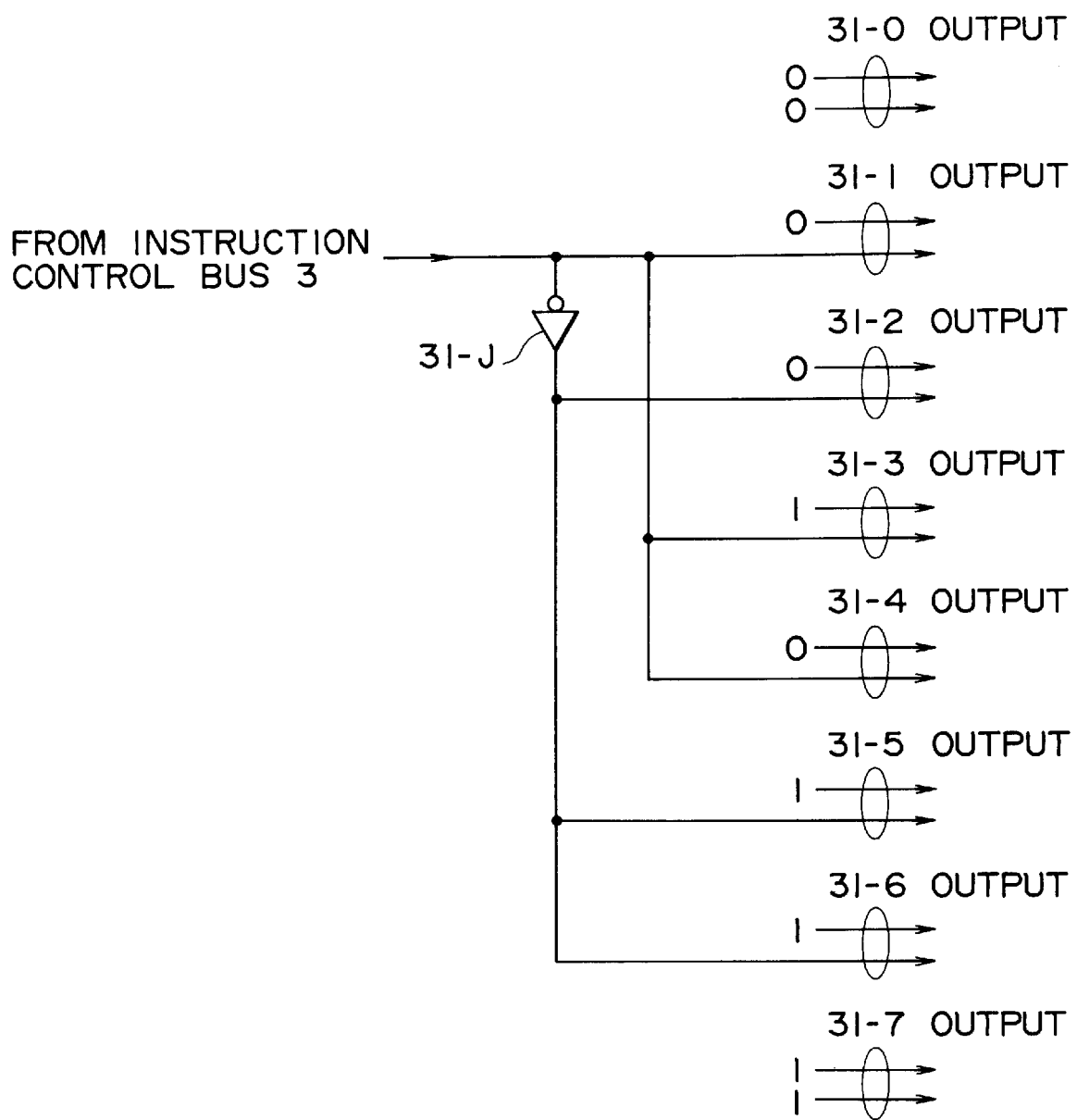
FIG. 12 is a block diagram of an embodiment obtained further simplifying the operation unit 31.

When the selectors 31-A to 31-D are further simplified according to the principle described above, the operating unit 31 can be configured as shown in FIG. 12. That is, a fixed value is prepared as a carry-over component and the value is outputted in each of the operating units 31-0 to 31-7. Besides, in each of the operating unit 31-0 and 31-7, a fixed value 0 and 1 are prepared as a sum component, and the value are constantly outputted.

In the operating units 31-1, 31-3, and 31-4, a control signal inputted is outputted as it is as a sum component. In the operating units 31-2, 31-5 and 31-6, a control signal inverted by the inverter 31-J is outputted as it is as a sum component.

Figure 13:
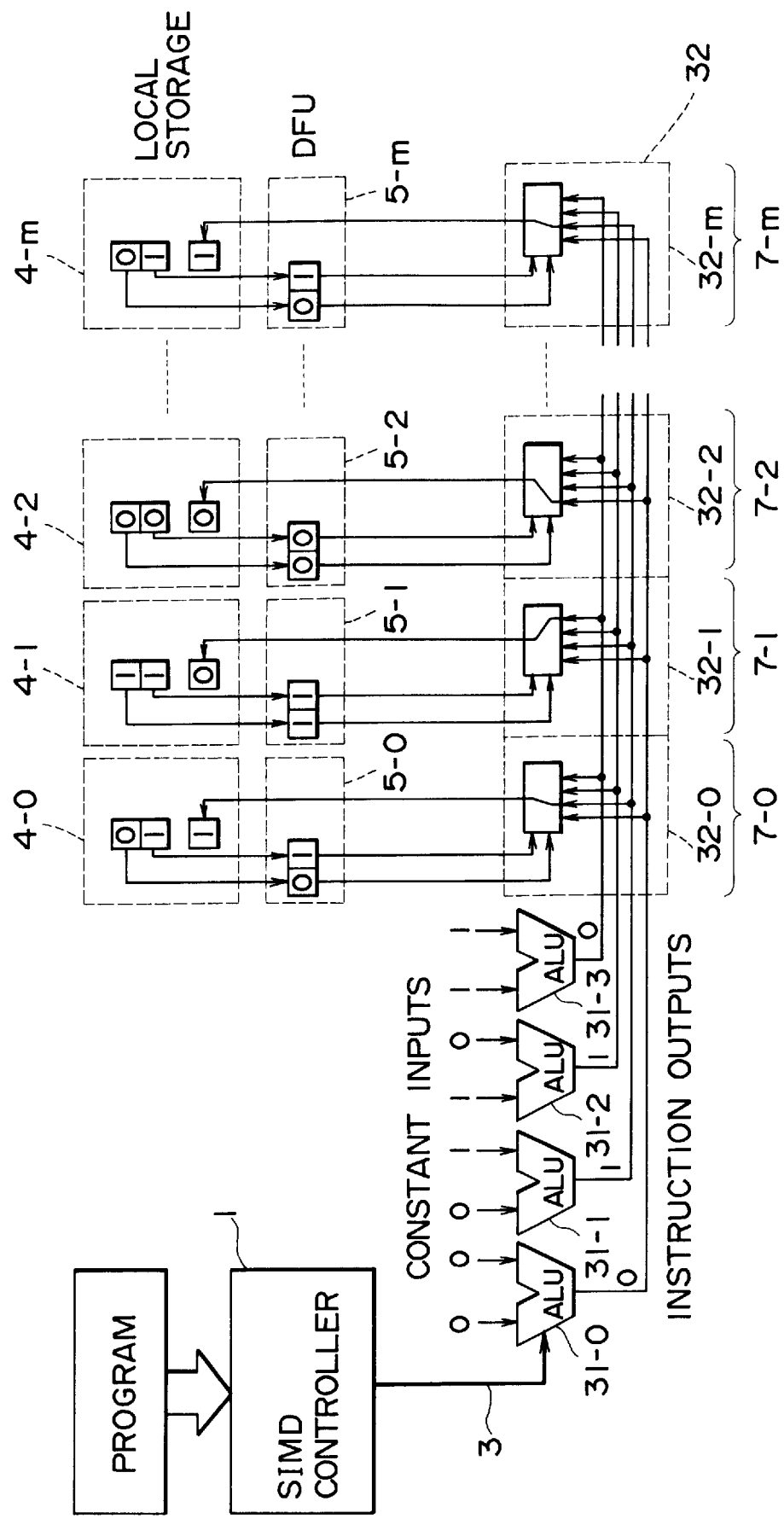
FIG. 13 is a block diagram of a SIMD control parallel processing method in the case that the number of input bits is two.

FIG. 13 schematically illustrates a configuration of a simplest SIMD control parallel processing method in which n=2. In other words, in the configuration, logical operation is assumed.

In this case, since n=2, operating units 31-0 to 31-3 are provided with the operating unit 31 which outputs operated results corresponding to 00, 01, 10, and 11. The selecting unit 32 is separated into selecting unit 32-0 to 32-m which is made to correspond to processor element 7-0 to 7-m. And, each selecting unit 32-j selects the data corresponding to the data retained in DFU 5-j of the processor element to output it to the local storage 4-0 to 4-m.

For example, since data 01 is retained in DFU 5-0, the selecting unit 32-0 selects the output of the operating unit 31-1 to output it to the local storage 4-0.

Since data 11 is retained in DFU 5-1, the selecting unit 32-1 selects the output of the operating unit 31-3 which performs operation for data 11, and outputs it to the local storage 4-1.

Figure 14:
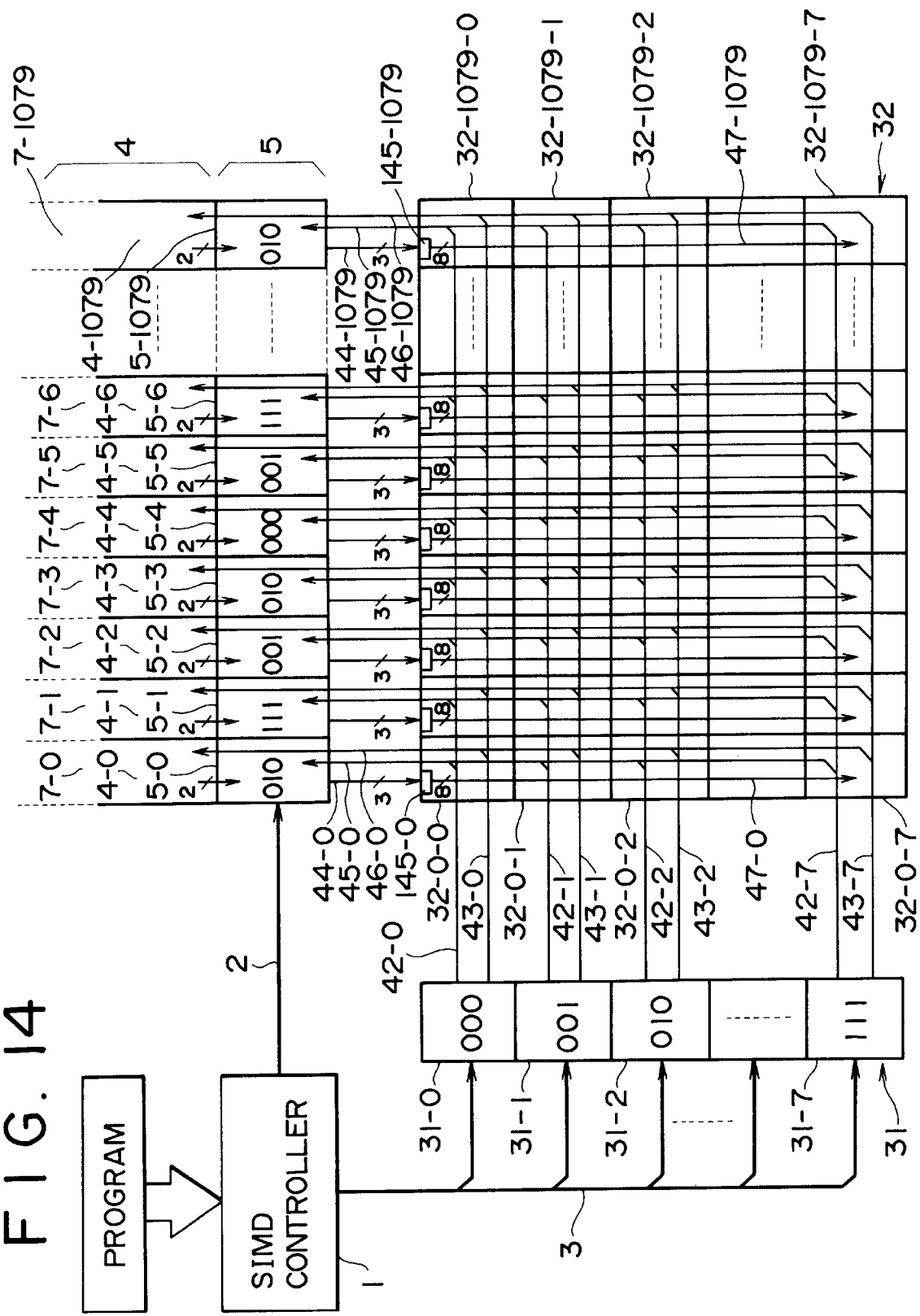
FIG. 14 is a block diagram showing another embodiment in a configuration in which the number of input bits is three.
Figure 15:
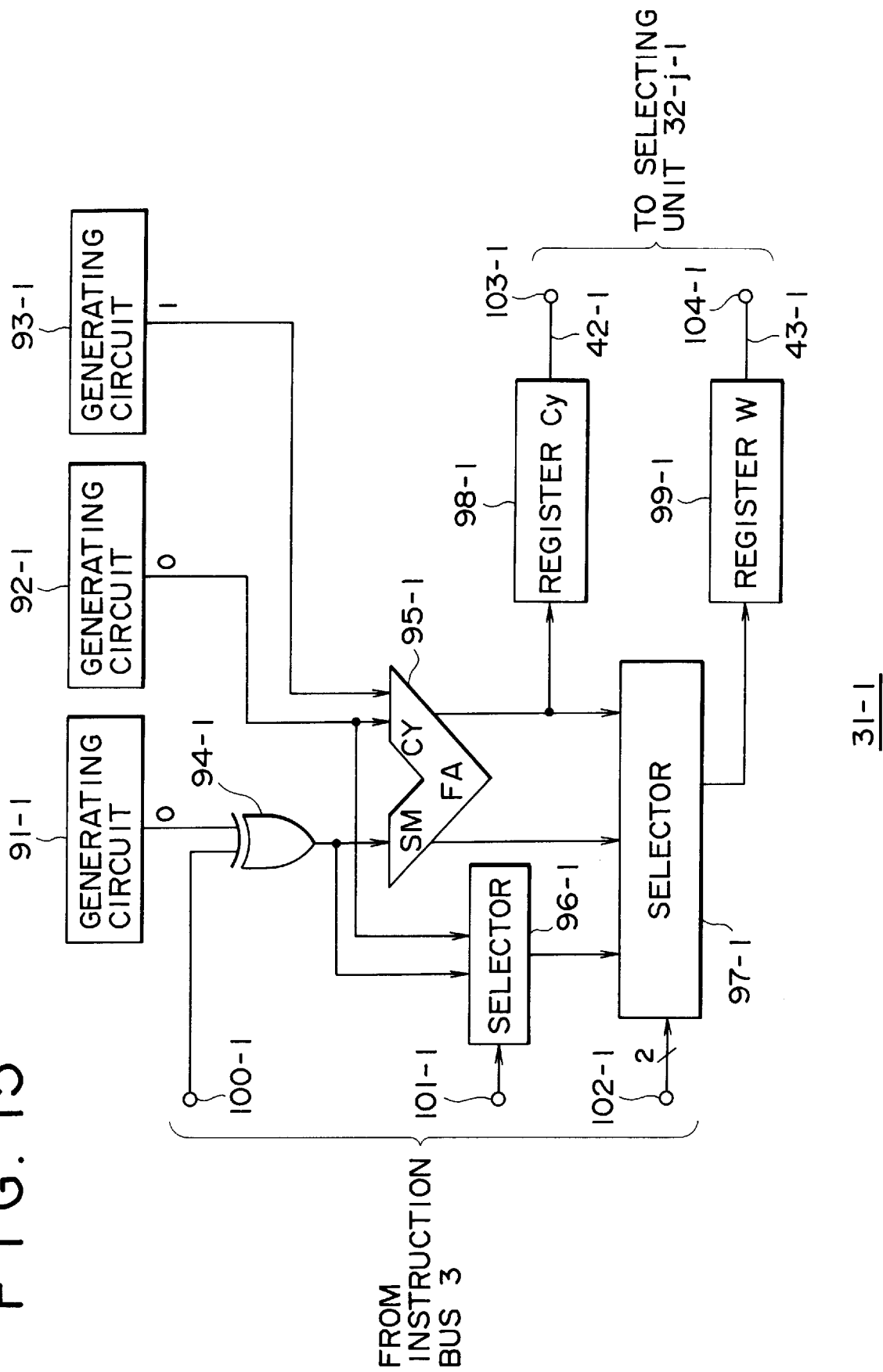
FIG. 15 is a block diagram showing an embodiment in a configuration of the operation unit shown in FIG. 15.
Figure 16:
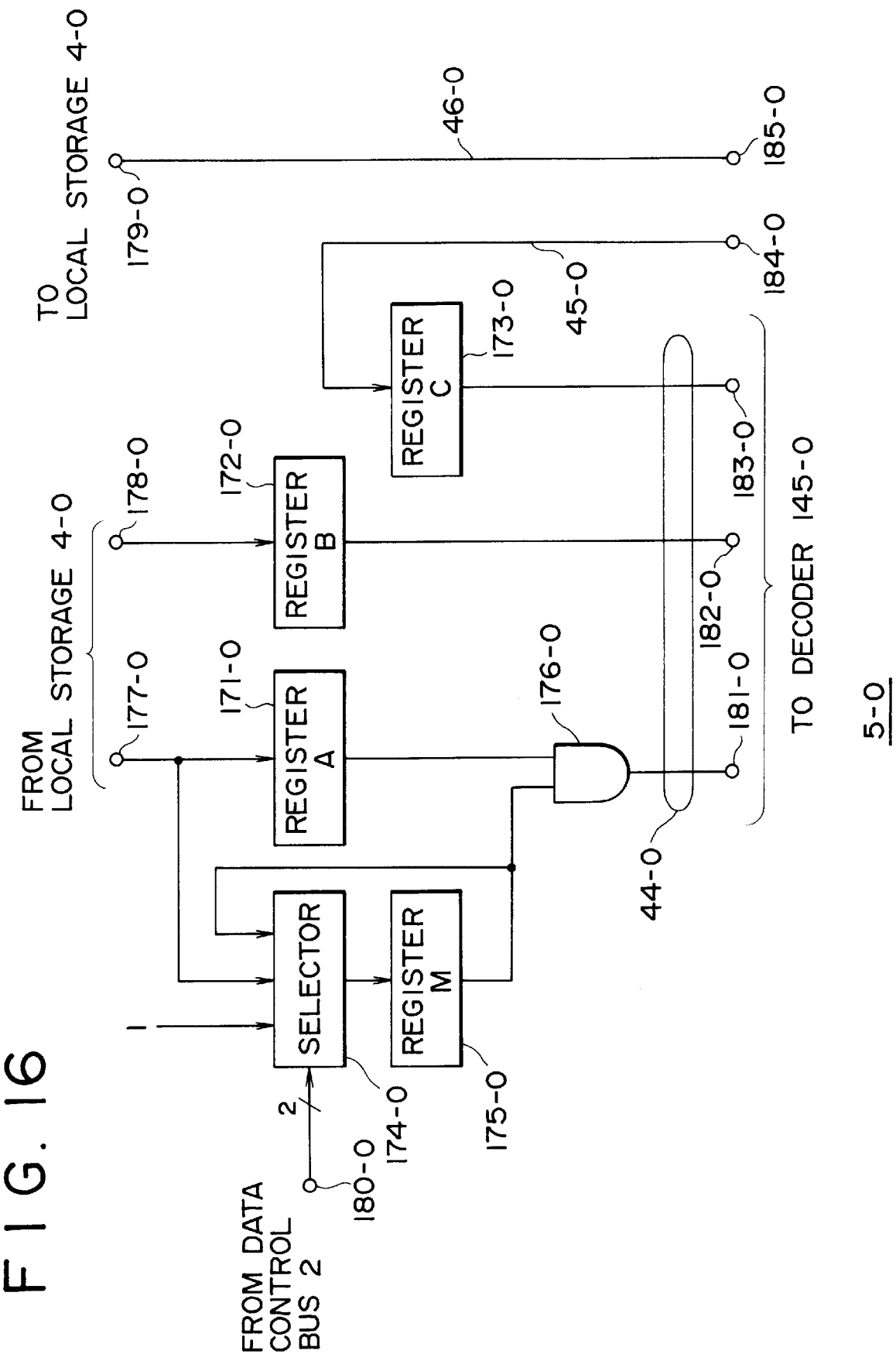
FIG. 16 is a block diagram of an embodiment in a configuration of the DFU-5 shown in FIG. 14.

FIG. 14 illustrates another configuration of a processor in which n=3. In this configuration, the SIMD controller 1 controls DFU 5 via a data control bus 2. Further, in this configuration, the operating unit 31-1 and DFU 5-0 are respectively configured as shown in FIGS. 15 and 16. The configuration of the selecting unit 32 is the same as those shown in FIGS. 15 and 16.

In the configuration shown in FIG. 15, generating circuit 91-1 to 93-1 retain data 0, 0, and 1, respectively. Like the case described above, although since these generating circuit 91-1 to 93-1 are provided to perform operation of the data 001 by the operating unit 31-1, for example, in operating unit 31-0, data 000 is retained here, and data 010 is retained in the operating unit 31-2.

The exclusive OR circuit 94-1 performs exclusive logical sum between data outputted from the generating circuit 91-1 and data inputted from the terminal 100-1 via an instruction control bus 3, and when a terminal 100-1 is logical al HIGH, outputs the operated result to the full adder (FA) 95-1 after being inverted. The outputs of the generating circuits 92-1 and 93-1 are inputted to the full adder as is. The full adder 95-1 adds three inputs each comprising 1-bit and outputs the added result comprising 2-bit to the selector 97-1. Among 2-bit output, a carry-over on the MSB side is supplied to a register 98-1 (register Cy) to be retained. The data retained in a register 98-1 is supplied to the selecting unit 32-j-1 (j=1 to 1079) from the terminal 103 connected to the line 42-1.

The selector 96-1, in response to a control signal inputted from the terminal 101-1 via an instruction control bus 3 issued from the SIMD controller, selects the output of the exclusive OR circuit 94-1 or the output of the generating circuit 92-1, and outputs the selected data to selector 97-1. The selector 97-1, in response to 2-bit control signal supplied from the terminal 102-1 via an instruction bus 3 by the SIMD controller, selects one of the three inputs and outputs it to the register 99-1 (register W). The data retained in the register 99-1 is supplied to the selecting unit 32-j-1 from the terminal 104-1 connected to the line 43-1.

In the operating unit 31-1, basically an operation specified 3-bit of 001 is performed, and thus its output becomes 01 as shown in table 1. In this case, the register 98-1 outputs 0 and the register 99-1 outputs 1.

Operating units 31-0, 31-2, 31-3, . . . , 31-7, not shown, are configured in a like manner. However, data retained in their generating unit 91-j to 93-i are different from each other.

FIG. 16 shows an exemplified configuration of DFU 5-0. In the exemplified configuration, 2-bit data outputted from the local storage 4-0 is supplied to a register 171-0 (register A) and a register 172-0 (register M) via terminals 177-0, and 178-0, respectively. Data of a logical 1, data inputted from the terminal 177-0, and data retained in the register 175-0 (register M) are inputted to the selector 174-0, and any of them is selected to be outputted to the register 175-0. A switch control signal of 2-bit is inputted to the selector 174-0 from the terminal 180 by the SIMD controller via the instruction control bus 3. An AND circuit 176-0 performs logical sum between an output of the register 171-0 and the output of the register 175-0, and outputs its output from a terminal 181-0.

Alternatively, the AND circuit 176-0 can be replaced with a NAND circuit that is faster than an AND circuit. In this case, it is required that the exclusive OR circuit 94-j of the operating unit 31-j (for example, the exclusive OR circuit shown in FIG. 15) is replaced with an exclusive NOR circuit or a control signal is inverted.

Data retained in the register 172-0 is devised so as to be outputted from a terminal 182-0. Further, a register 173-0 (register C) retains data supplied via the line 45-0 from the terminal 184-0, and outputs the retained data from a terminal 183-0. As described above, the terminals 181-0, 182-0, and 183-0 are connected to the terminals 139-0-0, 140-0-0, and 141-0-0 in FIG. 4. As described above, 3-bit data outputted from the terminals 181-0, 182-0, and 183-0 is decoded by the decoder 145-0 and any of the terminals 0 to 7 outputs a logical 1.

The terminal 185-0 shown in FIG. 16 is connected to the terminal 136-0-0 of the selecting unit 32-0-0 shown in FIG. 4, and transmits sum data inputted from the selecting unit 32-0 to the local storage 4-0 from the other terminal 179-0 of the line 46-0.

The other DFU 5-1 to -1079 are configured in the same manner as the DFU 5-0.

Figure 17:
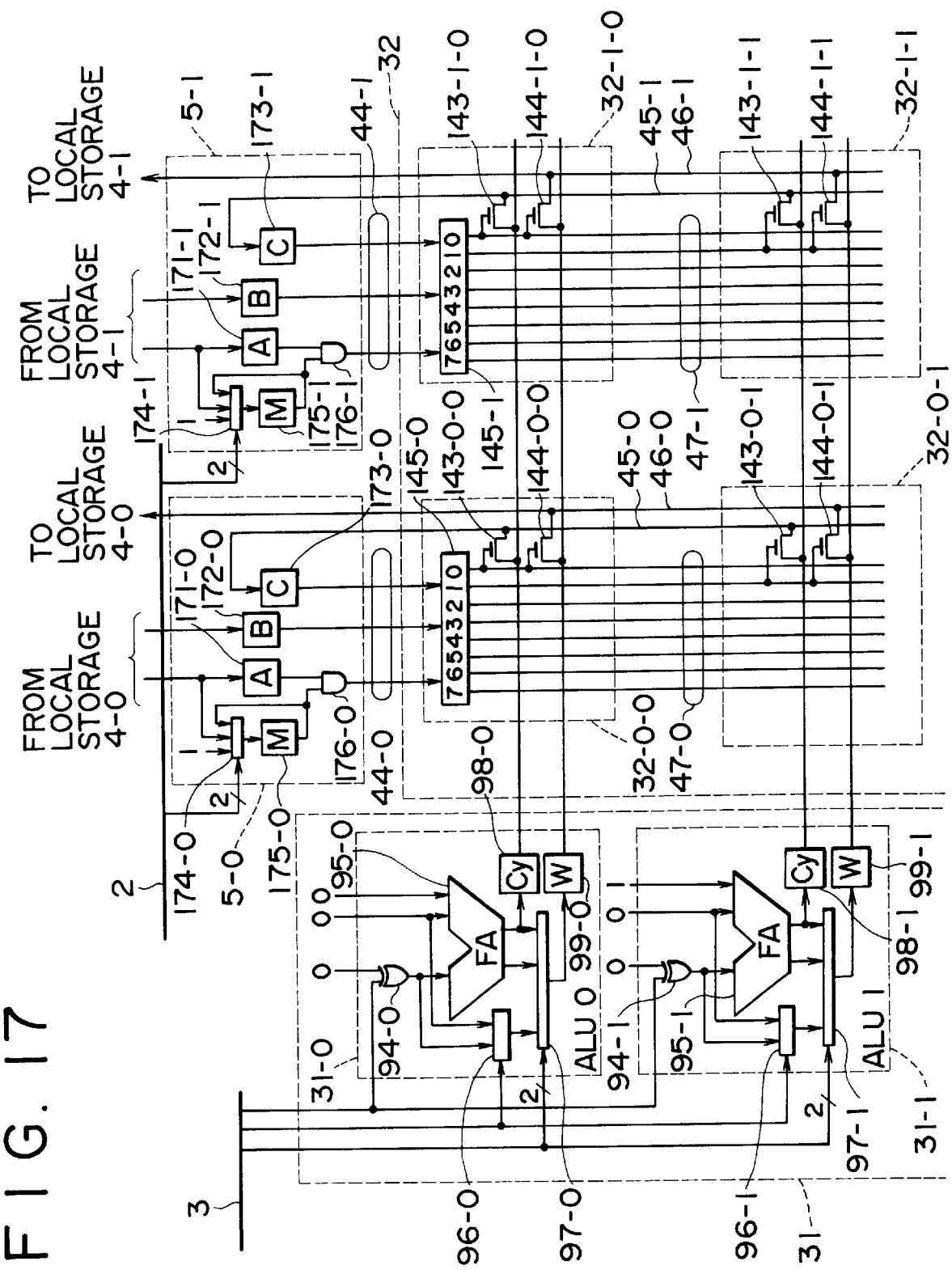
FIG. 17 is a block diagram showing a more detailed connection state of the embodiment in a configuration shown in FIG. 14.

Representing the operating unit 31, the selecting unit 32 and the DFU 5 all together leads to be enabled to be shown in FIG. 17. FIG. 17 shows connection state of the operating unit 31-0, 31-1, the selecting unit 32-0-0, 32-1-0, 32-0-1, and 32-1-1, and DFU 5-0, DFU 5-1.

This exemplified configuration includes a selector 96-1 provided as shown in FIG. 15, and thus the output of the exclusive OR circuit 94-1 and the output of the generating circuit 92-1 can be outputted to the line 43-1 via the selector 97-1.

Additionally, as shown in FIG. 16, in the DFU 5-0 instead of repeatedly selecting the output of the register 175-0, it can be configured such that a logical sum between past data (data retained in the register 175-0) and new data (data retained in the register 171-0) is performed in the circuit 176-0.

The other operations are similar to those in the exemplified configurations shown in FIGS. 2 to 7, thus omitting its specific explanation thereof.

In the exemplified configurations shown in FIG. 14 to 17, the configuration of the operating unit 31 can be further simplified in the same fashion as explained with reference to FIG. 12. The simplified configurations are not shown for these cases.

In the exemplified configuration described above, all number of the combinations specified by n-bit input, i.e. $2^n$ pieces (or sub-units) of operating units are previously provided. However, when it is apparent that some of the combinations do not exist, the operating units performing those combination of operations can be omitted. It is acceptable to prepare for the case in which all possible number of combinations of operating units are provided.

An input bit number n to the operating unit 31 which performs arithmetic and logical operation is not originally very large. On the other hand, for example, in the case of a parallel processing method of the image linear array type, the number of processors required is more than 100, and about 1,000, though the required number of the processors is specified to be 1,080 in the exemplified configuration shown in FIGS. 1 and 2, because the number of the processors corresponds to the number of the pixels constituting one horizontal scanning line. Conventionally, as described above, an ALU is devised to be provided with each processor element, its number becomes several hundred to about 1,000 or so. On the other hand, according to the present invention, when the input number of bits is assumed to be n, the number of processors is enough to be $2^n$ at maximum. Hence, the number of the operating unit 3 (the number of the ALU) can be minimized to be an extremely small value as $2^n$. As a result, the configuration can be simplified, thereby enabling the dedicated area to be reduced in the case where this is made as an IC. This reveals that a smaller IC can be realized.

Since the input of operation data is fixed in a circuit provided as the operating unit 31 of the present invention, some logic elements consisting of the ALU do not substantially cause a logic change. Such logic elements can therefore be removed. Consequently, the ALU in the operating unit 31 can be designed so that the number of logic elements is less than that in the conventional ALU. Smaller circuits can therefore be produced.

Besides, the portion of the selecting unit 32 can be sometimes a mere selector, but can be configured in a cross-over circuit. In this case, the circuit can be realized by the smaller number of semiconductor elements.

Furthermore, in the exemplified configuration carried out by the present invention, image data is processed, although the present invention can be applied to the case in processing other types of data.

What is claimed is:

1. A SIMD control parallel processing apparatus for performing a common operation in parallel in a plurality of elements, comprising:
   an operation unit having first and second retaining means,
   said first retaining means for retaining predetermined data specified by n-bit, said predetermined data corresponding to data combinations that may be stored in any of said plurality of elements, each data combination constituting a specific binary number;
   said second retaining means for pre-storing a plurality of operated results for all possible combinations of said n-bit data according to a predetermined operation; and
   selecting means for selecting, for each of said elements, said predetermined data retained in said first retaining means that matches the data combination stored within that element, to obtain a corresponding operated result retained by said second retaining means.

2. A SIMD control parallel processing apparatus as set forth in claim 1, wherein said second retaining means receives an instruction instructing said operation.

3. A SIMD control parallel processing apparatus as set forth in claim 1, further comprising a data fetching unit for performing a logical sum between new data and past data.

4. A SIMD control parallel processing apparatus as set forth in claim 1, wherein said selecting means further comprises switch means for performing switching operation so as to select data corresponding to said predetermined data retained in said first retaining means from among said operated results retained in said second retaining means.

5. A SIMD control parallel processing apparatus as set forth in claim 4, wherein said selecting means further comprises generating means for generating a switch signal for switching said switch means to correspond to said predetermined data retained in said first retaining means.

6. A SIMD control parallel processing apparatus as set forth in claim 1, wherein said second retaining means retains $2^n$ operated results.

7. A SIMD control parallel processing apparatus as set forth in claim 1, wherein said data stored in each element is image data and an element is assigned for each pixel.

8. A SIMD control parallel processing apparatus as set forth in claim 1, wherein said SIMD control parallel processing is a 1-bit element processing operation.

9. A method of operating in a SIMD control parallel processing method for performing common operation in parallel in a plurality of elements, comprising the steps of:
   retaining operation data of a plurality n bits in each of said elements;
   pre-storing operated results of a predetermined operation for all possible combinations of said n bits, each combination constituting a specific binary number; and
   selecting, for each of said elements, operated result data in accordance with a combination of said n bits stored within that element.

10. A SIMD control parallel processing method for performing common operation in parallel in a plurality of elements, comprising the steps of:
    retaining operation data specified by n-bit, said operation data corresponding to data combinations that may be stored in any of said elements;
    pre-storing operated results obtained by performing an operation with all possible combinations of said n-bit data according to a predetermined operation, each combination constituting a specific binary number; and
    selecting, for each of said elements, said operation data retained in said retaining step that matches the data combination stored within that element, so as to obtain a corresponding operated result from among said pre-stored operated results.

11. A SIMD control parallel processing method for performing common operation in parallel in a plurality of elements as set forth in claim 10, wherein said pre-storing step further comprises the step of specifying an operation equation for the predetermined operation.

12. A SIMD control parallel processing method as set forth in claim 10, further comprising a logical step of performing a logical product between new data and past data.

13. A SIMD control parallel processing method as set forth in claim 10, wherein said selecting step further comprises a switching step of performing a switching operation so as to select data corresponding to said pre-stored operated data.

14. A SIMD control parallel processing method as set forth in claim 10, wherein $2^n$ operated results are pre-stored in said pre-storing step.

15. A SIMD control parallel processing method as set forth in claim 10, wherein said data stored within each element is image data and each said element is assigned for a pixel.

16. A SIMD control parallel processing method as set forth in claim 10, wherein said SIMD control parallel processing method is implemented in a 1-bit element processor.

17. A SIMD control parallel processing apparatus for performing a common operation in parallel in a plurality of elements, each element having registers for retaining data of n bits, said apparatus comprising:
    an operation unit comprising plural sub-units, each sub-unit configured to pre-store an operation result for a predetermined combination of said n bits constituting a specific binary number based on a predefined operation; and
    a selector, associated with each said element, for selecting, according to a combination of the n bits retained in the associated element, one of said sub-units to provide an operation result;

wherein the number of said sub-units is substantially smaller than the number of said elements.

18. Apparatus according to claim 17, wherein said predefined operation is an arithmetic operation.

19. Apparatus according to claim 17, wherein n is a single digit number, and said plural sub-units comprise $2^n$ sub-units.

20. Apparatus according to claim 17, further comprising means for storing the selected operation result in a local storage associated with each element.

21. Apparatus according to claim 17, wherein said operation result comprises a plurality of data bits, and said operation unit further comprises selection means for selecting from among said plurality of data bits in response to a received instruction, to provide an output operated result.

22. Apparatus according to claim 21, wherein n is a single digit number, said plural sub-units comprise $2^n$ sub-units, and said selection means comprises a plurality m of selection circuits, wherein m is less than $2^n$.

23. Apparatus according to claim 17, wherein said selector includes:

a decoder connected to n input lines containing n bits of the associated element, for decoding the n-bit combination thereof and providing a specified logic level on one of $2^n$ decoder output lines according to the decoding; and a switch coupled to each decoder output line and to one of said sub-units, said switch operable to switch the operation result of the corresponding sub-unit to a selector output line when the specified logic level is present on the connected decoder output line.

24. Apparatus according to claim 17, wherein n equals three, and said n bits comprise first and second bits and a carry-over bit.

25. Apparatus according to claim 24, wherein said operation result comprises one resultant bit plus a carry-over bit.

26. Apparatus according to claim 17, wherein n equals two, and said operation result is a single bit.

* * * * *